(12) United States Patent
Hirose et al.

(10) Patent No.: US 10,626,809 B2
(45) Date of Patent: *Apr. 21, 2020

(54) ENGINE DEVICE

(71) Applicant: YANMAR CO., LTD., Osaka-shi, Osaka (JP)

(72) Inventors: Koichi Hirose, Osaka (JP); Tatsuro Ohsara, Osaka (JP); Taishi Murakami, Osaka (JP)

(73) Assignee: YANMAR CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/370,811

(22) Filed: Dec. 6, 2016

(65) Prior Publication Data

US 2017/0082041 A1    Mar. 23, 2017
US 2018/0355807 A9    Dec. 13, 2018

Related U.S. Application Data

(63) Continuation of application No. PCT/JP2015/065455, filed on May 28, 2015.

(30) Foreign Application Priority Data

Jun. 6, 2014   (JP) ................... 2014-118036
Jun. 6, 2014   (JP) ................... 2014-118037

(51) Int. Cl.
    *F02D 41/00*      (2006.01)
    *F02B 37/18*      (2006.01)
    (Continued)

(52) U.S. Cl.
    CPC ......... *F02D 41/0007* (2013.01); *F01N 13/10* (2013.01); *F02B 29/0406* (2013.01);
    (Continued)

(58) Field of Classification Search
    CPC ............ F02D 41/0007; F02D 41/0002; F02D 41/0025; F02D 41/1401; F02D 9/02;
    (Continued)

(56) References Cited

U.S. PATENT DOCUMENTS 5,606,951 A    3/1997   Southern et al.
6,273,076 B1   8/2001   Beck et al.
(Continued)

FOREIGN PATENT DOCUMENTS

CN     101535616 A    9/2009
CN     102213147 A    10/2011
(Continued)

*Primary Examiner* — Patrick Hamo
*Assistant Examiner* — Wesley G Harris
(74) *Attorney, Agent, or Firm* — Norton Rose Fulbright US LLP

(57) ABSTRACT

An engine device includes a main throttle valve disposed at a portion where an outlet of a supercharger and an inlet of an intercooler are coupled to each other, an exhaust bypass flow path configured to couple an outlet of an exhaust manifold to an exhaust outlet of the supercharger, an exhaust bypass valve disposed in the exhaust bypass flow path, an air supply bypass flow path configured to bypass a compressor of the supercharger, and an air supply bypass valve disposed in the air supply bypass flow path. Within a low load range of a load on the engine device, when the load is lower than a predetermined load, feedback control is performed on the main throttle valve, and when the load is higher than the predetermined load, map control based on a data table is performed on the main throttle valve.

17 Claims, 18 Drawing Sheets

(51) Int. Cl.

| | | |
|---|---|---|
| *F02D 9/02* | (2006.01) | |
| *F01N 13/10* | (2010.01) | |
| *F02B 29/04* | (2006.01) | |
| *F02M 35/10* | (2006.01) | |
| *F02B 43/02* | (2006.01) | |
| *F02B 37/16* | (2006.01) | |
| *F02D 19/06* | (2006.01) | |
| *F02D 45/00* | (2006.01) | |
| *F02D 19/10* | (2006.01) | |
| *F02D 21/08* | (2006.01) | |
| *F02D 41/14* | (2006.01) | |
| *F02D 41/30* | (2006.01) | |
| *F02M 35/104* | (2006.01) | |
| *F02D 23/00* | (2006.01) | |
| *F02D 11/10* | (2006.01) | |
| *F02D 41/24* | (2006.01) | |

(52) U.S. Cl.
CPC ............ *F02B 37/16* (2013.01); *F02B 37/18* (2013.01); *F02B 43/02* (2013.01); *F02D 9/02* (2013.01); *F02D 19/06* (2013.01); *F02D 19/0642* (2013.01); *F02D 19/10* (2013.01); *F02D 21/08* (2013.01); *F02D 41/0002* (2013.01); *F02D 41/0025* (2013.01); *F02D 41/1401* (2013.01); *F02D 41/3094* (2013.01); *F02D 45/00* (2013.01); *F02M 35/104* (2013.01); *F02M 35/10157* (2013.01); *F02D 11/105* (2013.01); *F02D 23/00* (2013.01); *F02D 41/0027* (2013.01); *F02D 41/1488* (2013.01); *F02D 41/2422* (2013.01); *F02D 2011/102* (2013.01); *F02D 2041/0022* (2013.01); *F02D 2041/141* (2013.01); *F02D 2041/142* (2013.01); *F02D 2041/1409* (2013.01); *F02D 2200/101* (2013.01); *F02D 2200/1002* (2013.01); *Y02T 10/144* (2013.01); *Y02T 10/146* (2013.01); *Y02T 10/36* (2013.01); *Y02T 10/42* (2013.01)

(58) Field of Classification Search
CPC ..... F02D 2041/1409; F02D 2041/0022; F02D 2011/102; F02D 41/0027; F02D 2200/101; F02D 2041/142; F02D 11/105; F02D 41/2422; F02D 41/1488; F02D 2200/1002; F02B 29/0406; F02B 37/18; F02M 35/104; F02M 35/10157; F01N 13/10; Y02T 10/146; Y02T 10/144; Y02T 10/42

See application file for complete search history.

(56) References Cited

U.S. PATENT DOCUMENTS

| | | | | |
|---|---|---|---|---|
| 6,318,306 | B1* | 11/2001 | Komatsu | F02B 43/08 123/3 |
| 8,037,850 | B2* | 10/2011 | Pursifull | F01N 5/02 123/198 F |
| 2004/0065293 | A1 | 4/2004 | Goto | |
| 2005/0103309 | A1 | 5/2005 | Nakagawa et al. | |
| 2009/0198432 | A1* | 8/2009 | Tabata | F02D 23/02 701/103 |
| 2011/0162626 | A1* | 7/2011 | Styles | F02B 47/08 123/568.21 |
| 2013/0282256 | A1 | 10/2013 | Watanuki et al. | |
| 2014/0041380 | A1* | 2/2014 | Byrd | F02B 37/16 60/602 |
| 2014/0102092 | A1* | 4/2014 | Karnik | F02B 37/186 60/602 |
| 2014/0128222 | A1* | 5/2014 | Norman | F16H 59/32 477/98 |
| 2014/0130783 | A1* | 5/2014 | Takaki | F02B 37/00 123/568.11 |
| 2015/0315986 | A1 | 11/2015 | Minami | |
| 2015/0361872 | A1* | 12/2015 | Takaki | F02D 21/08 123/568.11 |

FOREIGN PATENT DOCUMENTS

| | | |
|---|---|---|
| JP | 02-173320 A | 7/1990 |
| JP | 09-500433 A | 1/1997 |
| JP | 2000-203307 A | 7/2000 |
| JP | 2000-248953 A | 9/2000 |
| JP | 2002-004899 A | 1/2002 |
| JP | 2008-202545 A | 9/2008 |
| JP | 2013-224596 A | 10/2013 |
| JP | 2013-238194 A | 11/2013 |
| WO | 2002/081888 A1 | 10/2002 |
| WO | 2013/164987 A1 | 11/2013 |
| WO | 2014/084024 A1 | 6/2014 |

\* cited by examiner

ENGINE DEVICE

CROSS-REFERENCE TO RELATED APPLICATIONS

The present application is a continuation application of International Application No. PCT/JP2015/065455, filed May 28, 2015, which claims priority to Japanese Patent Application No. 2014-118036, filed Jun. 6, 2014, Japanese Patent Application No. 2014-118037, filed Jun. 6, 2014. The contents of these applications are incorporated herein by reference in their entirety.

BACKGROUND OF THE INVENTION

The present invention relates to an engine device.

Heretofore, in ships, such as a tanker and a transport ship, and land-based power generation facilities, diesel engines have been used as their driving sources. Exhaust gas discharged from such a diesel engine, unfortunately, contains a large number of exhaust emissions, such as oxides of nitrogen, oxides of sulfur, and particulate matter, that are likely to become harmful substances that impede environmental preservation. For this reason, recently, a gas engine, one of engines each serving as a substitute for the diesel engine and being capable of reducing the amount of generated harmful substances, has been widely used.

Moreover, as an engine configured to combine the characteristics of the diesel engine and the characteristics of the gas engine, a dual fuel engine configured to combine a premixed combustion method that allows combustion of gaseous fuel (fuel gas), such as natural gas, having been mixed with air and supplied to a combustion chamber, and a diffusion combustion method that allows combustion of liquid fuel, such as heavy oil, having been injected into a combustion chamber, has been proposed (see Japanese Examined Patent Publication No. 2002-004899 and Japanese Examined Patent Publication No. 2008-202545).

SUMMARY OF THE INVENTION

In such a dual fuel engine, for a diesel mode and a gas mode, there is a difference in a required air-fuel ratio, and further, an air flow amount required in the gas mode is small compared with the diesel mode relative to the same load. For this reason, a supercharger is required to meet a specification in the diesel mode, whereas, when operated in the gas mode, the supercharger is required to be capable of providing air amount appropriate to an air-fuel ratio in the gas mode. Further, in conventional dual fuel engines, when operated in the gas mode, there is room for improvement to realize sufficient responsiveness in air flow amount control, and high trackability and appropriateness relative to a load variation in air-fuel ratio control.

Thus, it is a technical object of the present invention to provide a multi-fuel employment type engine device in which improvements based on considerations in view of such current situations as described above have been incorporated.

According to a first aspect of the present invention, an engine device includes at least one cylinder; an intake manifold configured to supply air into the at least one cylinder; an exhaust manifold configured to discharge exhaust gas from the at least one cylinder; at least one main fuel injection valve configured to inject liquid fuel into the at least one cylinder to cause combustion of the liquid fuel; at least one gas injector configured to mix gas fuel with the air supplied by the intake manifold; a supercharger including a compressor and configured to compress air through a use of the exhaust gas from the exhaust manifold; an intercooler configured to cool compressed air resulting from the compression by the supercharger and supply resultant cooled air to the intake manifold; a main throttle valve disposed at a portion where an outlet of the supercharger and an inlet of the intercooler are coupled to each other; an exhaust bypass flow path configured to couple an outlet of the exhaust manifold to an exhaust outlet of the supercharger; an exhaust bypass valve disposed in the exhaust bypass flow path; an air supply bypass flow path configured to bypass the compressor of the supercharger; and an air supply bypass valve disposed in the air supply bypass flow path. Further, within a low load range of a load on the engine device, when the load is lower than a predetermined load, feedback control is performed on the main throttle valve, and when the load is higher than the predetermined load, map control based on a data table is performed on the main throttle valve.

According to a second aspect of the present invention, in the engine device according to the first aspect of the present invention, within the low load range, when the load is higher than the predetermined load, feedback control may be performed on the exhaust bypass valve and map control may be performed on the air supply bypass valve.

According to a third aspect of the present invention, in the engine device according to the first aspect of the present invention, within the low load range, when the load is lower than the predetermined load, the exhaust bypass valve may be caused to fully open and the air supply bypass valve may be caused to be fully closed.

According to a fourth aspect of the present invention, in the engine device according to the first aspect of the present invention, within a medium and high load range of the load, the opening degree of the main throttle valve may be kept to a fully-open opening degree, and each of the exhaust bypass valve and the air supply bypass valve may be controlled to allow pressure inside the intake manifold to be adjusted to a target value appropriate to the load.

According to a fifth aspect of the present invention, in the engine device according to the fourth aspect of the present invention, within the medium and high load range, the feedback control may be performed on the exhaust bypass valve, and the map control may be performed on the air supply bypass valve.

According to the embodiment of the present invention, an engine device includes at least one cylinder; an intake manifold configured to supply air into the at least one cylinder; an exhaust manifold configured to discharge exhaust gas from the at least one cylinder; at least one main fuel injection valve configured to inject liquid fuel into the at least one cylinder to cause combustion of the liquid fuel; at least one gas injector configured to mix gas fuel with the air supplied by the intake manifold; a supercharger including a compressor and configured to compress air through a use of the exhaust gas from the exhaust manifold; an intercooler configured to cool compressed air resulting from the compression by the supercharger and supply resultant cooled air to the intake manifold; a main throttle valve disposed at a portion where an outlet of the supercharger and an inlet of the intercooler are coupled to each other; an exhaust bypass flow path configured to couple an outlet of the exhaust manifold to an exhaust outlet of the supercharger; an exhaust bypass valve disposed in the exhaust bypass flow path; an air supply bypass flow path configured to bypass the compressor of the supercharger; and an air supply bypass valve disposed in the air supply bypass flow path. Further, within a low load range of a load on the engine device, when the load is lower than a predetermined load, feedback control is performed on the main throttle valve, and when the load is higher than the predetermined load, map control based on a data table is performed on the main throttle valve. Thus, in a state in which the supercharger is optimized in accordance with a combustion mode specification for liquid fuel, in a combustion mode using gas fuel, control of each of the opening degree of the exhaust bypass valve and the opening degree of the air supply bypass valve in accordance with the variation of the engine load also realizes an air-fuel ratio optimized to the engine load. During a load variation, therefore, the deficiency of the amount of air needed for the combustion is eliminated or minimized, and as a result, the engine device also operates in a suitable condition in the gas mode in a state in which the supercharger optimized for use in the diesel mode is used.

Further, within the low load range, when the engine load is higher than the predetermined load, feedback control on the exhaust bypass valve and map control on the air supply bypass valve are concurrently performed, and thus, the responsiveness of flow amount control by the exhaust bypass valve is complemented by the air supply bypass valve, and a control range of the air supply bypass valve is complemented by the exhaust bypass valve. Moreover, within the low load range, in the case where the engine load is lower than the predetermined load, even when air pressure inside the intake manifold becomes negative during a low load operation, concurrent control of causing the exhaust bypass valve to fully open and of causing the air supply bypass valve to be fully closed realizes securing an air amount needed for the combustion.

Further, according to the embodiment of the present invention, within a medium and high load range, each of the exhaust bypass valve and the air supply bypass valve is controlled so as to allow pressure inside the intake manifold to be adjusted to a target value appropriate to the load. Thus, in a state in which the supercharger is optimized in accordance with a combustion mode specification for liquid fuel, in a combustion mode using gas fuel, the air-fuel ratio is controlled so as to be responsive to the variation of the engine load. In this regard, during a load variation, the deficiency of the amount of air needed for the combustion is eliminated or minimized, and as a result, the engine device also operates in a more suitable condition in the gas mode in a state in which the supercharger is optimized for use in the diesel mode is used.

Further, within the medium and high load range, feedback control on the air supply bypass valve and map control on the exhaust bypass valve that are concurrently performed realize supplying the engine device with air adapted to an air-fuel ratio needed for the combustion of the gas fuel. Control of the opening degree of the exhaust bypass valve in accordance with the variation of an engine load realizes supplying the engine with air adapted to an air-fuel ratio needed for the combustion of the gas fuel. Further, a combination with responsive control operation by the air supply bypass valve increases trackability relative to a load variation in the gas mode. Moreover, control of air pressure by both of the air supply bypass valve and the exhaust bypass valve realizes expansion of a control range of the control of air pressure.

DESCRIPTION OF THE EMBODIMENTS

Hereinafter, an embodiment resulting from embodying the present invention will be described on the basis of figures when this embodiment is applied to a pair of propulsion and power-generation mechanisms mounted in a ship of a twin-engine and twin-shaft type.

Figure 1:
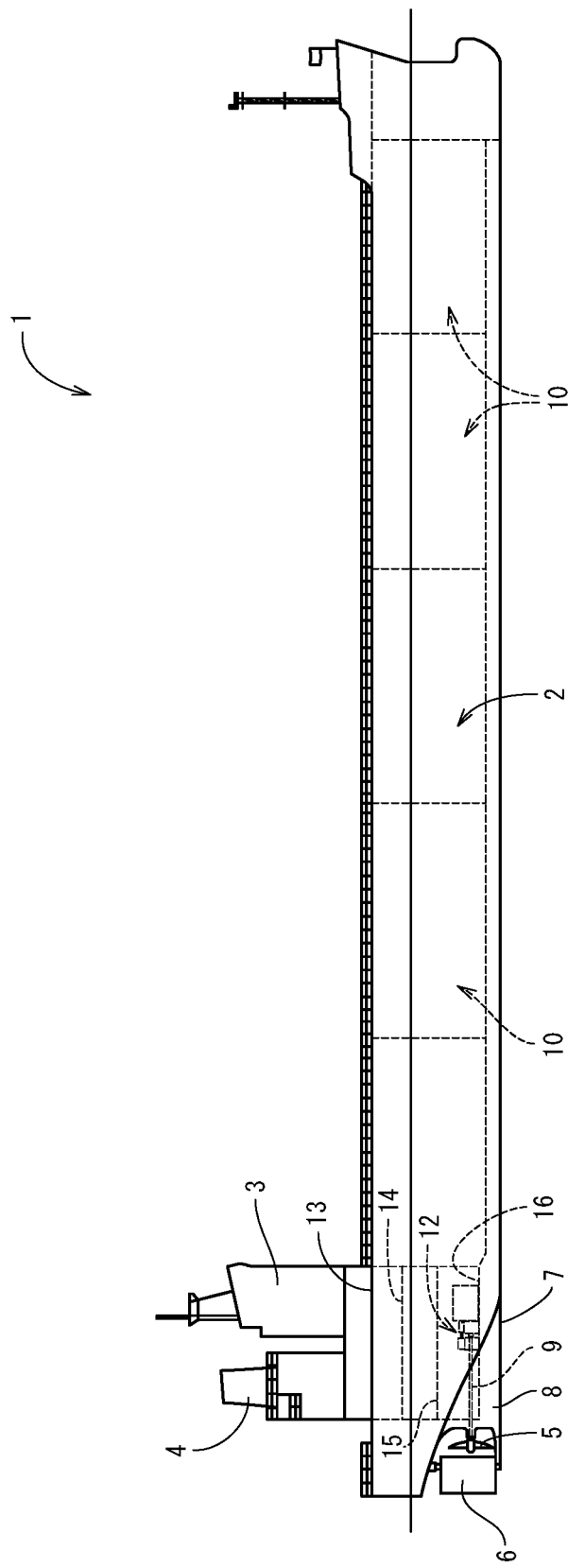
FIG. 1 is a side view of the whole of a ship according to an embodiment of the present invention.
Figure 2:
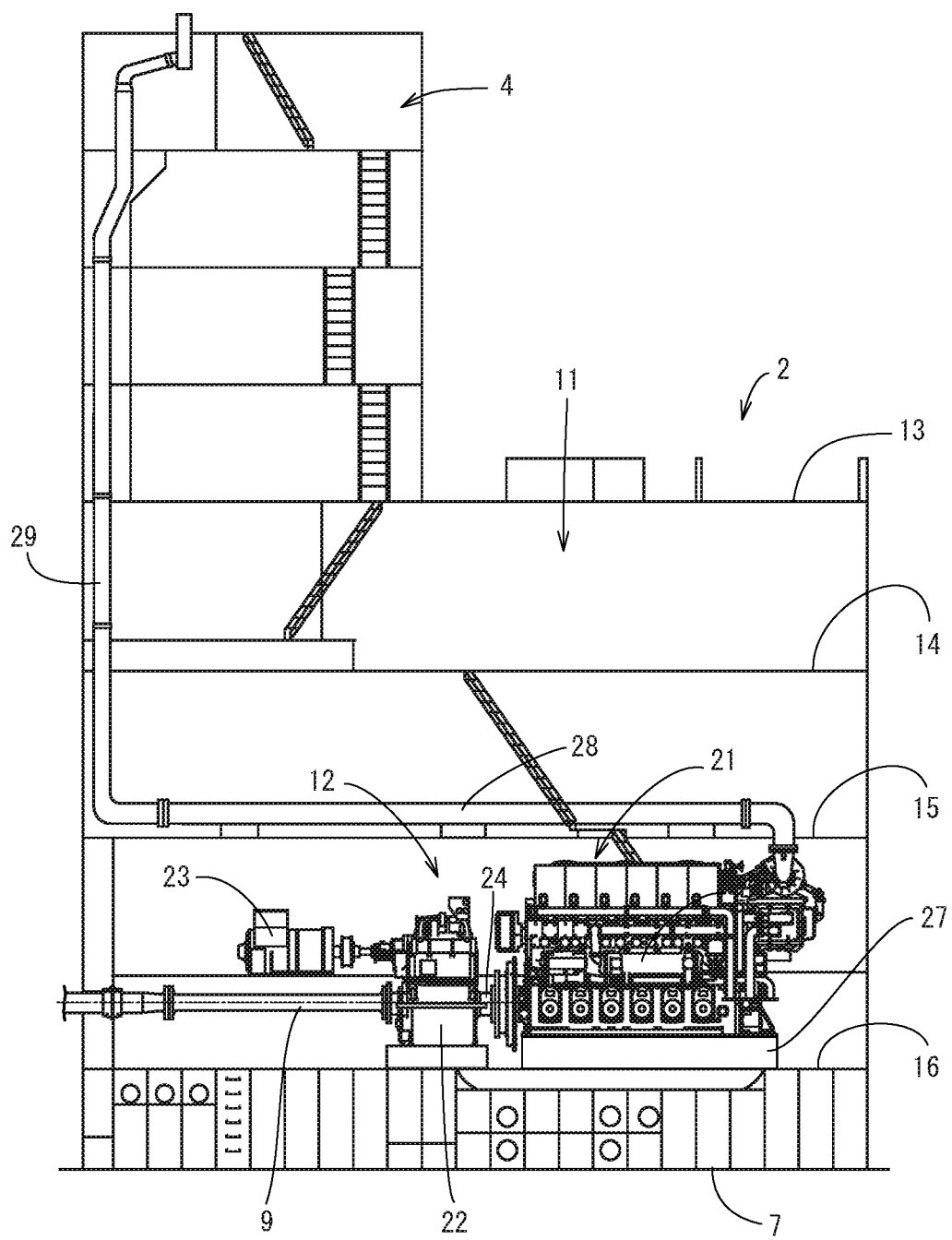
FIG. 2 is a cross-sectional side view of a machine room.
Figure 3:
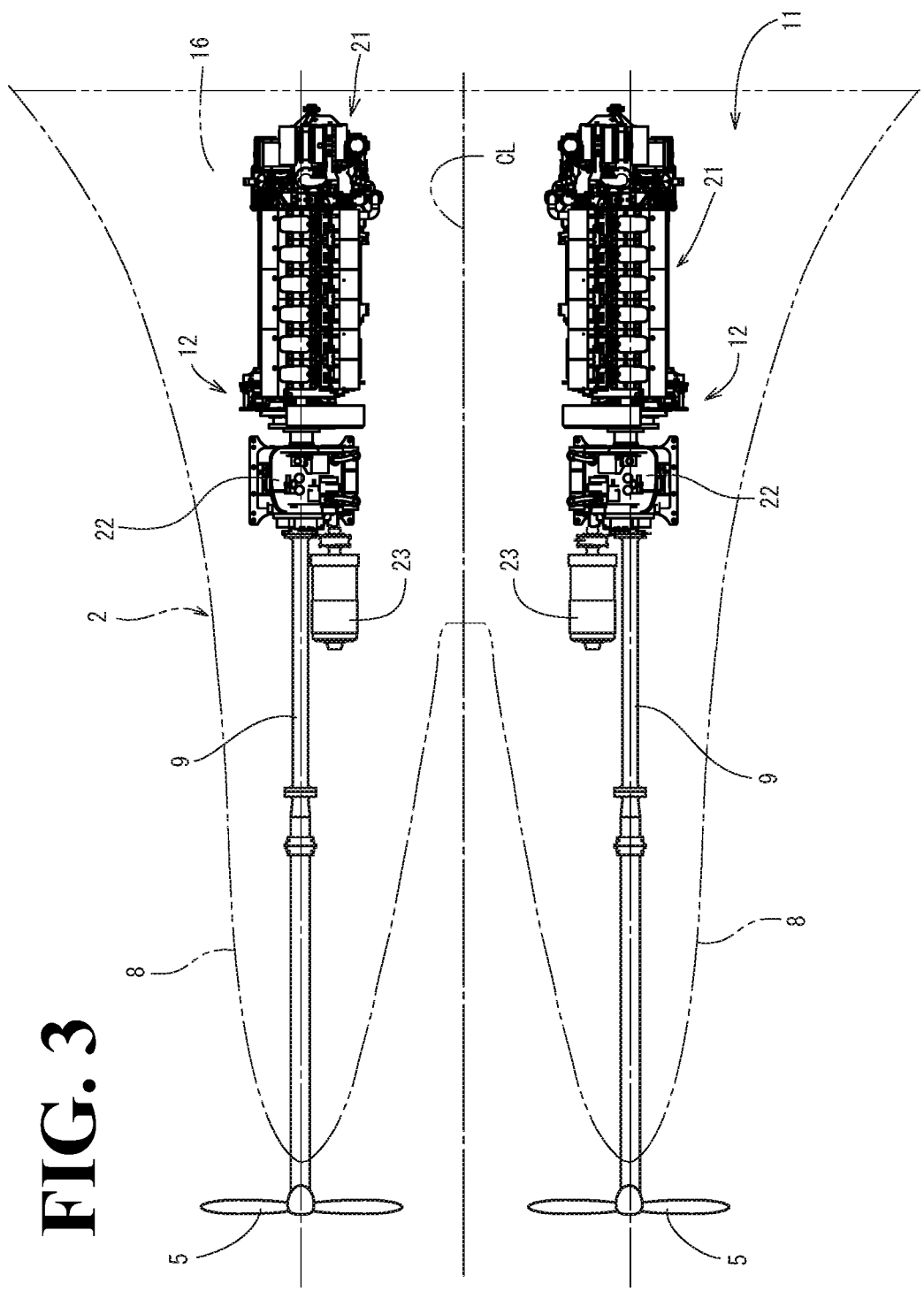
FIG. 3 is a plan view of the machine room.

First, the outline of a ship will be described. As shown in FIGS. 1 to 3, a ship 1 according to this embodiment includes a hull 2, a cabin 3 (a bridge deck), a funnel 4 (a smoke stack), a pair of propellers 5, and a rudder 6. The cabin 3 is disposed at the aft side of the hull 2. The funnel 4 is disposed behind the cabin 3. The pair of propellers 5 and the rudder 6 are disposed in a lower portion of the rear side of the hull 2. In this case, a pair of skegs 8 are formed integrally with an aft portion of a bottom 7. Propulsion shafts 9 are each rotatably supported by a corresponding one of the skegs 8. The propulsion shafts 9 each drivingly rotate a corresponding one of the propellers 5. The slegs 8 are formed in a shape that is left-right symmetric about a hull center line CL (see FIG. 3). This hull center line CL divides a left-right direction side of the hull 2. That is, in a first embodiment, a twin skeg is employed as an aft-side shape of the hull 2.

A hold 10 is disposed in a fore portion and a center portion inside the hull 2, and, in an aft portion inside the hull 2, a machine room 11 is disposed. In the machine room 11, a pair of propulsion and power-generation mechanisms 12 are separately disposed at left and right portions sandwiching the hull center line CL. The propulsion and power-generation mechanisms 12 each serve as both of a driving source for a corresponding one of the propellers 5 and an electric-power supply source for the ship 1. Each of the propellers 5 is drivingly rotated by rotation power transmitted from a corresponding one of the propulsion and power-generation mechanisms 12 to a corresponding one of the propulsion shafts 9. The inside of the machine room 11 is partitioned in an upper-lower direction by an upper deck 13, a second deck 14, a third deck 15, and an inner bottom plate 16. The propulsion and power-generation mechanisms 12 according to the first embodiment are disposed on the inner bottom plate 16 located at the lowest stage of the machine room 11. Although not illustrated, the hold 10 is partitioned into a plurality of sections.

As shown in FIGS. 2 and 3, each of the propulsion and power-generation mechanisms 12 is a mechanism resulting from combining a medium-speed engine device 21 (a dual-fuel engine in this embodiment), a reduction gear 2, and a shaft drive power generator 23. The medium-speed engine device 21 is a driving source of a corresponding one of the propellers 5. The reduction gear 22 transmits power of a corresponding one the engine devices 21 to a corresponding one of the propulsion shafts 9. The shaft drive power generator 23 is driven by the power of a corresponding one of the engine devices 21 to generate electric power. Here, the "medium-speed" engine means an engine that drives at a rotation speed of approximately 500 to 1000 revolutions per one minute. Incidentally, a "low-speed" engine drives at a rotation speed of 500 rotations or less per one minute, and a "high-speed" engine drives at a rotation speed of 1000 rotations or more per one minute. The engine device 21 in this embodiment is configured to drive at a constant rotation speed falling within a medium speed range (a range approximately from 700 to 750 revolutions per one minute).

The engine device 21 includes a cylinder block 25 including an engine output shaft 24 (a crankshaft), and cylinder heads 26 mounted on the cylinder block 25. A base table 27 is installed on the inner bottom plate 16 at the lowest stage of the machine room 11 so as to be directly or via a vibration isolator (omitted from illustration). The cylinder block 25 of the engine device 21 is mounted on the base table 27. The engine output shaft 24 is extended in a direction along a front-rear length direction of the hull 2. That is, the engine device 21 is disposed inside the engine room 11 in a state in which the engine output shaft 24 is directed along the front-rear length direction of the hull 2

The reduction gear 22 and the shaft drive power regenerator 23 are disposed at the aft side of the engine device 21. The rear end of the engine output shaft 24 protrudes from the rear face side of the engine device 21. The reduction gear 22 is coupled to the rear end side of the engine output shaft in a power transmissible manner. The shaft drive power generator 23 is disposed at the opposite side of the reduction gear 22 from the engine device 21. The engine device 21, the reduction gear 22, and the shaft drive power generator 23 are disposed so as to be arranged in this order from the front side of the inside of the engine room 11. In this case, the reduction gear 22 and the shaft drive power generator 23 are disposed inside or adjacent to the skeg 8, which is located at the aft side. With this configuration, therefore, the engine device 21 is disposed at a position as close to the aft side as possible without being subjected to any restriction pertaining to a buttock line of the ship 1, and this disposition of the engine device 21 contributes to downsizing of the engine room 11.

The propulsion shaft 9 is disposed at the downstream side of the reduction gear 22 in a power transmission direction.

The contour of the reduction gear 22 protrudes downward from the engine device 21 and the shaft drive power generator 23. The front end side of the propulsion shaft 9 is coupled to the rear face side of the protruding portion in a power transmissible manner. The engine output shaft 24 (shaft core) and the propulsion shaft 9 are located in a state of causing their shafts to overlap each other in a plan view. The propulsion shaft 9 extends in the front-rear length direction of the hull 2 in a state of causing the position of the core of the propulsion shaft 9 to be shifted vertically relative to the engine output shaft 24 (shaft core). In this case, the propulsion shaft 9 is disposed at a position lower than the positions of the shaft drive power generator 23 and the engine output shaft 24 (shaft core) and close to the inner bottom plate 16. That is, the shaft drive power generator 23 and the propulsion shaft 9 are respectively separated to an upper portion and a lower portion, and do not interfere with each other. This configuration, therefore, downsizes each of the propulsion and power-generation mechanisms 12.

The constant-speed power output of the engine device 21 is transmitted from the rear end side of the engine output shaft 24 to the reduction gear 22, and then is branched and transmitted to each of the shaft drive power generator 23 and the propulsion shaft 9 by the reducer gear 22. One portion of the constant-speed power output of the engine 21 is subjected to reduction of its speed by the reduction gear 22 to a rotation speed of, for example, 100 to 120 revolutions per one minute, and then is transmitted to the propulsion shaft 9. The propeller 5 is drivingly rotated by the speed-reduced power from the reduction gear 22. Here, a variable pitch propeller capable of adjusting a ship speed through the change of a pitch angle of its propeller blades is employed as the propeller 5. Further, another portion of the constant-speed power output of the engine device 21 is subjected to increase of its speed by the reduction gear 22 to a rotation speed of, for example, 1200 to 1800 revolutions per one minute, and then is transmitted to a PTO shaft rotatably supported by the reduction gear 22. The rear end side of this PTO shaft of the reduction gear 22 is coupled to the shaft drive power generator 23 in a power transmissible manner to allow the power generation of the shaft drive power generator 23 to be driven based on the rotational power from the reduction gear 22. Electric power resulting from the power generation driven by the shaft drive power generator 23 is supplied to an electric system inside the hull 2.

The engine device 21 is coupled to an intake path (omitted from illustration) and an exhaust path 28. The intake path is used for taking air into the inside, and the exhaust path 28 is used for discharging exhaust gas to the outside. The air having been taken into the inside through the intake path is sent into each of cylinders 36 (i.e., into each of cylinders during an intake stroke). Further, since there exist two engine devices 21, two exhaust paths 28 exist. Each of the exhaust paths 28 is coupled to a corresponding one of extension paths 29. The extension paths 29 are configured to extend to the funnel 4 so as to directly communicate with the outside. The exhaust gas from each of the engine devices 21 is discharged to the outside of the ship 1 via a corresponding one of the exhaust gas paths 28 and a corresponding one of the extension paths 29.

As clear from the above description, the pair of propulsion and power-generation mechanisms 12, each constituted by combining the engine device 21, the reduction gear 22, which transmits the power of the engine device 21 to the propulsion shaft 9, which drivingly rotates the propeller 5, which is a propeller for ship propulsion, and the shaft drive power generator 23, which is allowed to generate electric power by the power of the engine device 21, are provided, and further, the pair of propulsion and power-generation mechanisms 12 are separated to and disposed at left and right portions sandwiching the hull center line CL in the machine room 11 inside the hull 2, and thus, an engine installation space in the engine room 11 is configured to be small compared with a conventionally structured machine room in which a plurality of engines (a main-engine and a sub-engine) are disposed. Further, this configuration shortens the front-rear length of the machine room 11 so as to compactly configure the machine room 11, and eventually, this compactly configured machine room 11 facilitates securing a space of the hold (i.e., a space other than the machine room 11) in the hull 2. The existence of the two propellers 5 increases the propulsion efficiency of the ship 1.

Moreover, since two engine devices 21 each being a main engine are provided, for example, even when one of the two engine devices 21 fails and is brought into a drive disabled state, the other one of the engine devices 21 enables the ship 1 to navigate, and secures redundancy to be provided in the vessel prime mover device, and eventually secures redundancy to be provided in the ship 1. Moreover, as described above, since each of the engine devices 21 drivingly rotates the propeller 5 and drives the shaft drive power generator 23, any one of the shaft drive power generators 23 is allowed to serve as a spare for the other one of them during a normal navigation. Thus, when any one of the engine devices 21 or any one of the shaft drive power generators 23 fails and this failure brings the supply of electric power to a halt, the supply of electric power is recovered merely by activating the other one of the shaft drive power generators 23 and establishing its frequency and voltage. Further, when, during a navigation using only one of the engine devices 21, the only one engine device 21 has been brought to a halt, the supply of electric power is recovered merely by activating the other one of the engine devices 21, which is in a halt state, and further by activating a shaft drive power generator 23 corresponding to the other one of the engine devices 21 and establishing its frequency and voltage.

Figure 4:
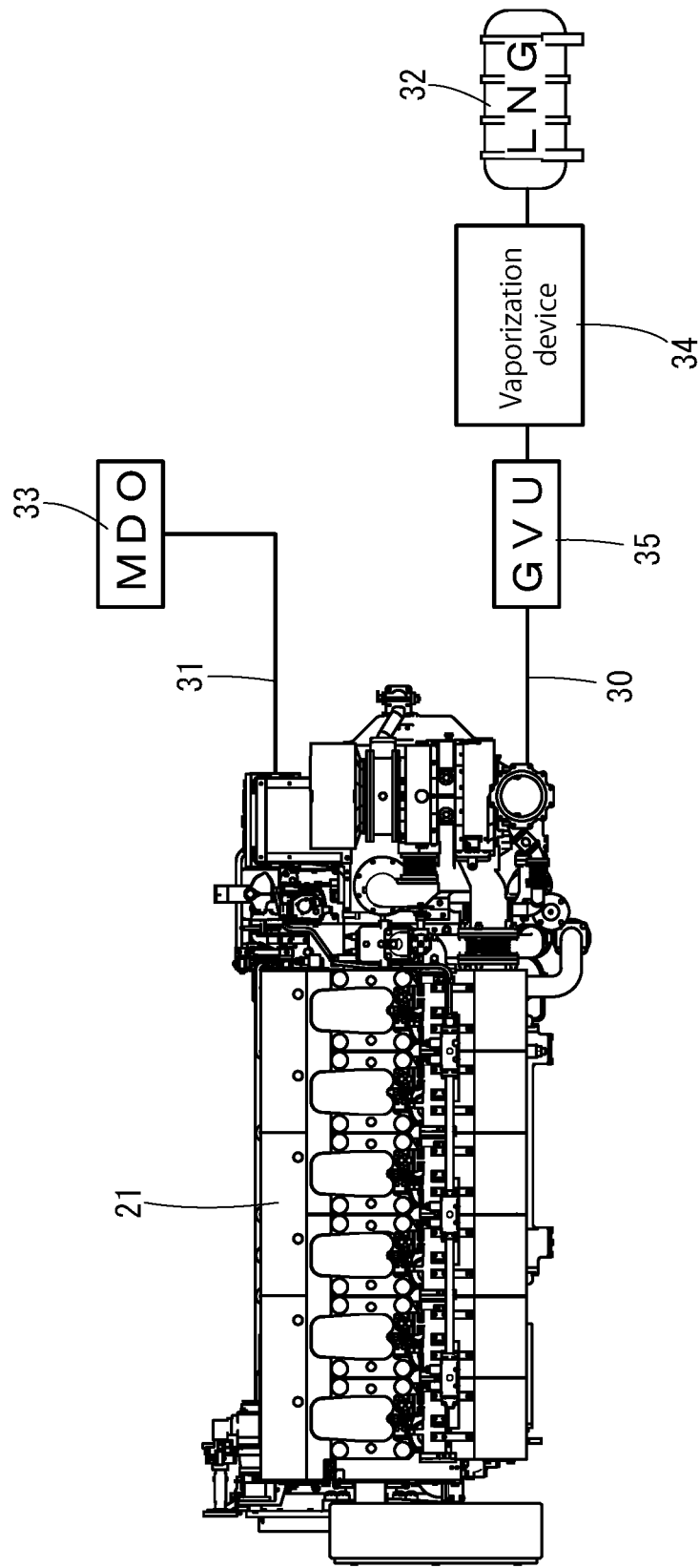
FIG. 4 is a schematic diagram illustrating a configuration of fuel supply paths in an engine device according to an embodiment of the present invention.
Figure 5:
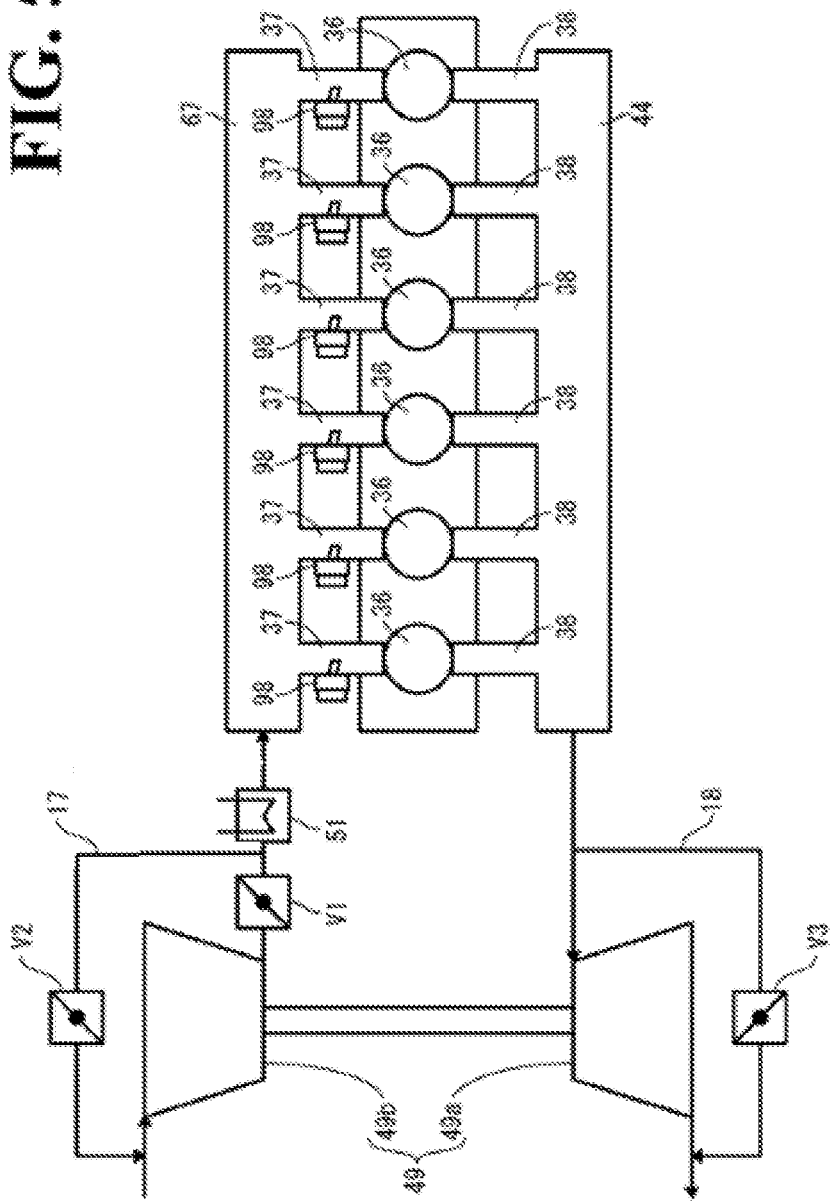
FIG. 5 is a schematic diagram illustrating a configuration of air supply and exhaust paths in the engine device.
Figure 6:
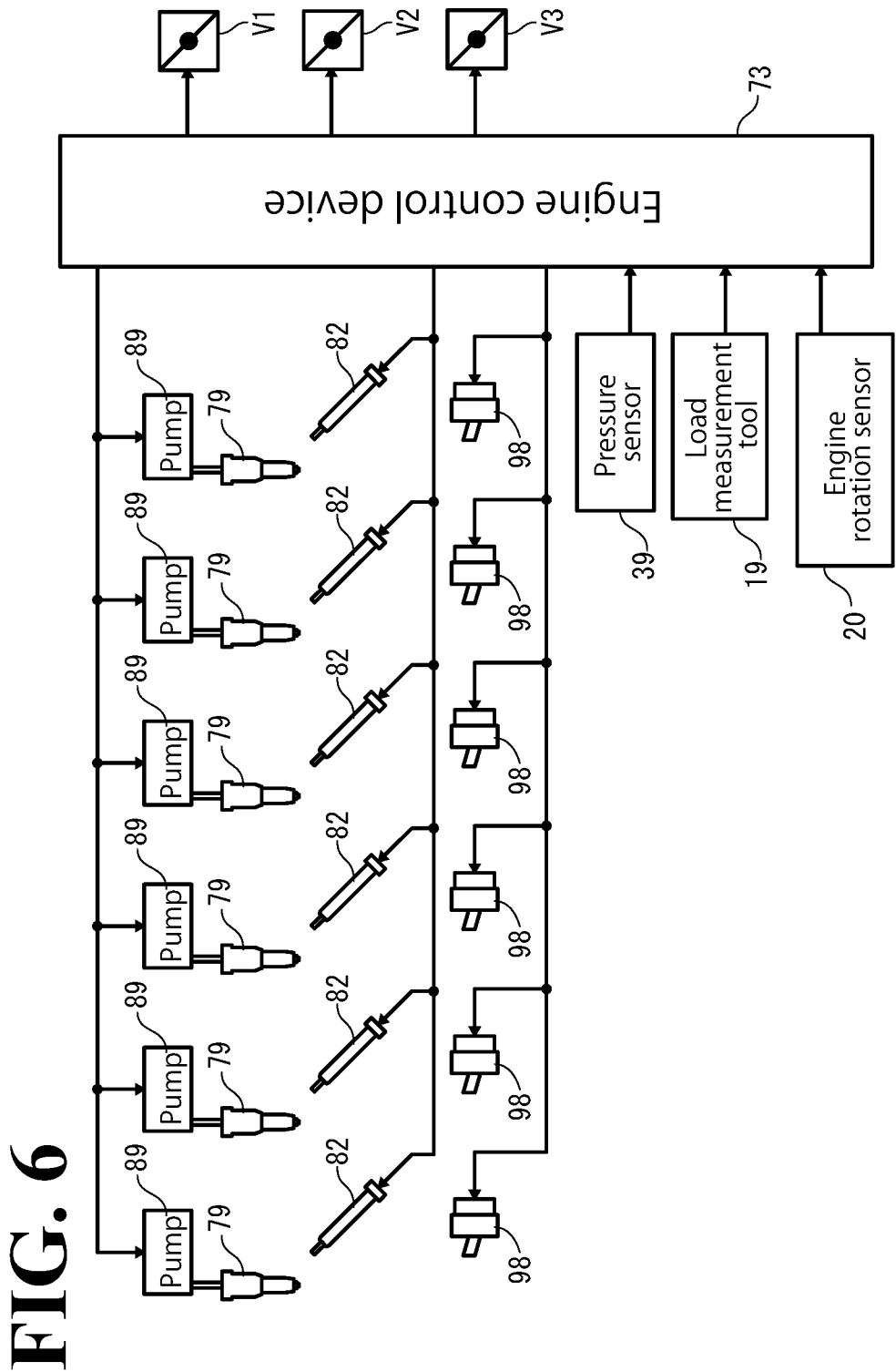
FIG. 6 is a block diagram illustrating a control system of the engine device.

Next, an outline of the configuration of a dual fuel engine 21 will be described with reference to FIGS. 4 to 7. This dual fuel engine 21 is used as a main engine in the ship 1. The dual fuel engine 21 (hereinafter referred to as just an "engine device 21") optionally selects and drives one of a premixed combustion method that allows combustion of gas fuel, such as natural gas, having been mixed with air gas and supplied to a combustion chamber, and a diffusion combustion method that allows combustion of liquid fuel, such as heavy oil, having been injected into a combustion chamber. FIG. 4 is a diagram illustrating fuel systems for supplying fuel to the engine device 21. FIG. 5 is a diagram illustrating an intake system and an exhaust system of the engine device 21. FIG. 6 is a control block diagram of the engine device 21.

As shown in FIG. 4, the engine device 21 is supplied with fuel from two systems of fuel supply paths 30 and 31, a gas fuel tank 32 being coupled to the fuel supply path 30, which is one of the two systems, a liquid fuel tank 33 being coupled to the fuel supply path 31, which is the other one of the two systems. That is, the engine device 21 is configured to allow fuel gas to be supplied to the engine device 21 through the fuel supply path 30, and allow fuel oil to be supplied to the engine device 21 through the fuel supply path 31. The fuel supply path 30 includes the gas fuel tank 32, a vaporization device 34, and a gas valve unit 35. The gas fuel tank 32 stores gas fuel in a liquefied state in itself. The vaporization device 34 vaporizes the liquefied fuel (fuel gas) of the gas fuel tank 32. The gas valve unit 35 adjusts an amount of fuel gas supplied from the vaporization device 34 to the engine device 21. That is, the fuel supply path 30 is configured to allow the vaporization device 34 and the gas valve unit 35 to be arranged in this order from the gas fuel tank 32 toward the engine device 21.

As shown in FIG. 5, the engine device 21 is configured to allow the plurality of cylinders 36 (six cylinders in this embodiment) to be arranged in series in the cylinder block 25. Each of the cylinders 36 communicates with an intake manifold (intake flow path) 67 (see FIG. 20) via a corresponding one of intake ports 37. The intake manifold 67 and the intake ports 37 are disposed inside the cylinder block 25. Each of the cylinders 36 communicates with an exhaust manifold (exhaust flow path) 44 via a corresponding one of exhaust ports 38. The exhaust manifold 44 and the exhaust ports 38 are disposed above the cylinder heads 26. A gas injector 98 is disposed at the intake port 37 of each of the cylinders 36. Thus, air from the intake manifold 67 is supplied to each of the cylinders 36 via a corresponding one of the intake ports 37, whereas exhaust gas from each of the cylinders 36 is discharged to the exhaust manifold 44 via a corresponding one of the exhaust ports 38. Further, when the engine device 21 operates in a gas mode, for each of the cylinders 36, fuel gas is supplied to a corresponding intake port 37 through a corresponding gas injector 98 to allow the fuel gas to be mixed with air from the intake manifold 67 and then be supplied to the each cylinder 36.

An exhaust inlet of a turbine 49a of a supercharger 49 is coupled to an exhaust outlet side of the exhaust manifold 44, and an air discharge outlet (fresh air outlet) of an intercooler 51 is coupled to an air inlet side (fresh air inlet side) of the intake manifold 67. An air discharge outlet (fresh air outlet) of a compressor 49b of the supercharger 49 is coupled to an air intake inlet (fresh air inlet) of the intercooler 51. A main throttle valve V1 is disposed between the compressor 49b and the intercooler 51, and the opening degree of the main throttle valve V1 is adjusted to adjust the flow amount of air supplied to the intake manifold 67.

An air supply bypass flow path 17 couples an air inlet side of the intercooler 51 to an air intake inlet (fresh air inlet) side of the compressor 49b. The air supply bypass flow path 17 recirculates part of air discharged from the outlet of the compressor 49b to the inlet of the compressor 49b. That is, the air supply bypass flow path 17 is released to outside air at the upstream side of the air intake inlet of the compressor 49b, while the air supply bypass flow path 17 is coupled to a coupling portion where the intercooler 51 and the main throttle valve V1 are coupled to each other. An air supply bypass valve V2 is disposed in the air supply bypass flow path 17, and the opening degree of the air supply bypass valve V2 is adjusted to adjust the flow amount of air flown from the downstream side of the main throttle valve V1 into the intercooler 51.

An exhaust bypass flow path 18 couples an exhaust outlet side of the turbine 49a to the exhaust outlet side of the exhaust manifold 44. That is, the exhaust bypass flow path 18 is released to outside air at the downstream side of the exhaust outlet of the turbine 49a, while the exhaust bypass flow path 18 is coupled to a coupling portion where the exhaust outlet of the turbine 49a and the exhaust inlet of the turbine 49a are coupled to each other. An exhaust-gas valve V3 is disposed in the exhaust bypass flow path 18, and the opening degree of the exhaust bypass valve V3 is adjusted to adjust the flow amount of exhaust gas flown into the turbine 49a so as to allow an air compression amount of the compressor 49b to be adjusted.

The engine device 21 includes the supercharger 49 and the intercooler 51. The supercharger 49 allows the exhaust gas from the exhaust manifold 44 to compresses air. The intercooler 51 cools compressed air having been compressed by the supercharger 49, and then supplies resultant cooled air to the intake manifold 67. The engine device 21 includes the main throttle valve V1 at the coupling portion where the outlet of the supercharger 49 and the inlet of the intercooler 51 are coupled to each other. The engine device 21 includes the exhaust bypass flow path 18, which couples the outlet of the exhaust manifold 44 to the exhaust outlet of the supercharger 49, and includes the exhaust bypass valve V3 in the exhaust bypass flow path 18. In a state in which the supercharger 49 is optimized in accordance with a diesel mode specification, in a gas mode, control of the opening degree of the exhaust bypass valve V3 in accordance with the variation of an engine load also realizes an air-fuel ratio optimized to the engine load. With this configuration, therefore, during a load variation, the excess or deficiency of an amount of air needed for combustion is eliminated or minimized, and as a result, the engine device 21 operates optimally in the gas mode even in a state in which the supercharger is optimized for use in the diesel mode is used.

The engine device 21 includes the air supply bypass flow path 17, which bypasses the supercharger 49, and includes the air supply bypass valve V2 in the air supply bypass flow path 17. Control of the opening degree of the air supply bypass valve V2 in accordance with the variation of an engine load realizes supplying the engine air adapted to an air-fuel ratio needed for the combustion of the fuel gas. Further, a combination with responsive control operation by the air supply bypass valve V2 increases a response speed relative to a load variation in the gas mode.

The engine device 21 allows the air supply bypass flow path 17 to be coupled to a portion located between the inlet of the intercooler 51 and the main throttle valve V1 to allow compressed air discharged from the compressor 49b to be fed back to the inlet of the inlet of the compressor 49b. With this configuration, the responsiveness of the flow amount control by the exhaust bypass valve V3 is complemented by the air supply bypass valve V2, and a control range of the air supply bypass valve V2 is complemented by the exhaust bypass valve V3. Accordingly, this configuration improves trackability of air-fuel ratio control in the gas mode during a load variation or upon change of an operation mode in a use for ships.

As shown in FIG. 6, the engine device 21 includes an engine control device 73 (a.k.a., an engine control unit (ECU) or an engine control module (ECM)), and this engine control device 73 controls individual portions of the engine device 21. The engine device 21 includes, for each of the cylinders 36, a pilot fuel injection valve 82, a fuel injection pump 89, and a gas injector 98. The engine control device 73 respectively supplies with the pilot fuel injection valve 82, the fuel injection pump 89, and the gas injector 98 with control signals to control a pilot fuel injection by the pilot fuel injection valve 82, fuel oil supply by the fuel injection pump 89, and gas fuel supply by the gas injector 98.

The engine control device 73 supplies the main throttle valve V1, the air supply bypass valve V2, and the exhaust bypass valve V3 with control signals to adjust their respective opening degrees so as to adjust air pressure (intake manifold pressure) inside the intake manifold 67. A pressure sensor 39 measures air pressure inside the intake manifold 67, and upon receipt of a measurement signal from the pressure sensor 39, the engine control device 73 detects intake manifold pressure. The engine control device 73 receives a measurement signal from a load measurement tool 19, such as a watt transducer or a torque sensor, and calculates a load on the engine device 21. The engine device 73 receives a measurement signal from an engine rotation sensor 20, such as a pulse sensor, for measuring a rotation number of the crankshaft 24, and detects an engine rotation number of the engine device 21.

When the engine device 21 operates in the diesel mode, the engine control device 73 controls, for each of the cylinders 36, the opening/closing of a control valve in the fuel injection pump 89 to cause combustion in the each cylinder 36 at predetermined timing points. That is, the engine control device 73 allows the control valve in the fuel injection pump 89 to open in synchronization with the injection timing points for the each cylinder 36 to cause fuel oil to be injected into the each cylinder 36 through a corresponding main fuel injection valve 79 so as to cause ignition in the each cylinder 36. Further, in the diesel mode, the engine control device 73 keeps the supply of each of the pilot fuel and the fuel gas in a halt state.

In the diesel mode, the engine control device 73 performs feedback control on the timing points of the injections through the main fuel injection valve 79 in the each cylinder 36 on the basis of an engine load (an engine output) having been measured by the load measurement tool 19 and an engine rotation number having been measured by the engine rotation sensor 20. With this configuration, the engine 21 outputs an engine load needed by the propulsion and power-generation mechanism 12 and, concurrently, rotates at an engine rotation number adapted to a propulsion speed of the ship. Further, the engine control device 73 controls the opening degree of the main throttle valve V1 on the basis of the intake manifold pressure having been measured by the pressure sensor 39 to allow the supercharger 49 to supply the intake manifold 67 with compressed air that becomes an air flow amount adapted to a needed engine output.

When the engine device 21 operates in the gas mode, for each of the cylinders 36, the engine control device 73 adjusts the opening degree in the gas injector 98 to set the gas flow amount of fuel supplied into the each cylinder 36. Further, the engine control device 73 controls the opening/closing of the pilot fuel injection valve 82 to cause combustion in the each cylinder 36 at predetermined timing points. That is, the gas injector 98 supplies the intake port 37 with fuel gas having a flow amount adapted to the valve aperture to allow the fuel gas to be mixed with air from the intake manifold 67 and then be supplied to the each cylinder 36. Further, the engine control device 73 allows the control valve in the pilot fuel injection valve 82 to open in synchronization with injection timing points for the each cylinder 36 to allow the injection of the pilot fuel to generate an ignition source so as to cause ignition in the each cylinder 36, to which the premixed gas has been supplied. Further, in the gas mode, the engine control device 73 keeps the supply of the fuel oil in a halt state.

In the gas mode, the engine control device 73 performs feedback control of the flow amount of fuel gas supplied by the gas injector 98 and timing points of the injections through the pilot injection valve 82 in the each cylinder 36 on the basis of an engine load having been measured by the load measurement tool 19 and an engine rotation number having been measured by the engine rotation sensor 20. Further, the engine control device 73 adjusts the opening degree of each of the main throttle valve V1, the air supply bypass valve V2, and the exhaust bypass valve V3 on the basis of the intake manifold pressure having been measured by the pressure sensor 39. With this configuration, the intake manifold pressure is adjusted to pressure adapted to an engine output, and further, an air-fuel ratio for the fuel gas supplied from the gas injectors 98 is adjusted to a value adapted to the engine output.

Figure 7:
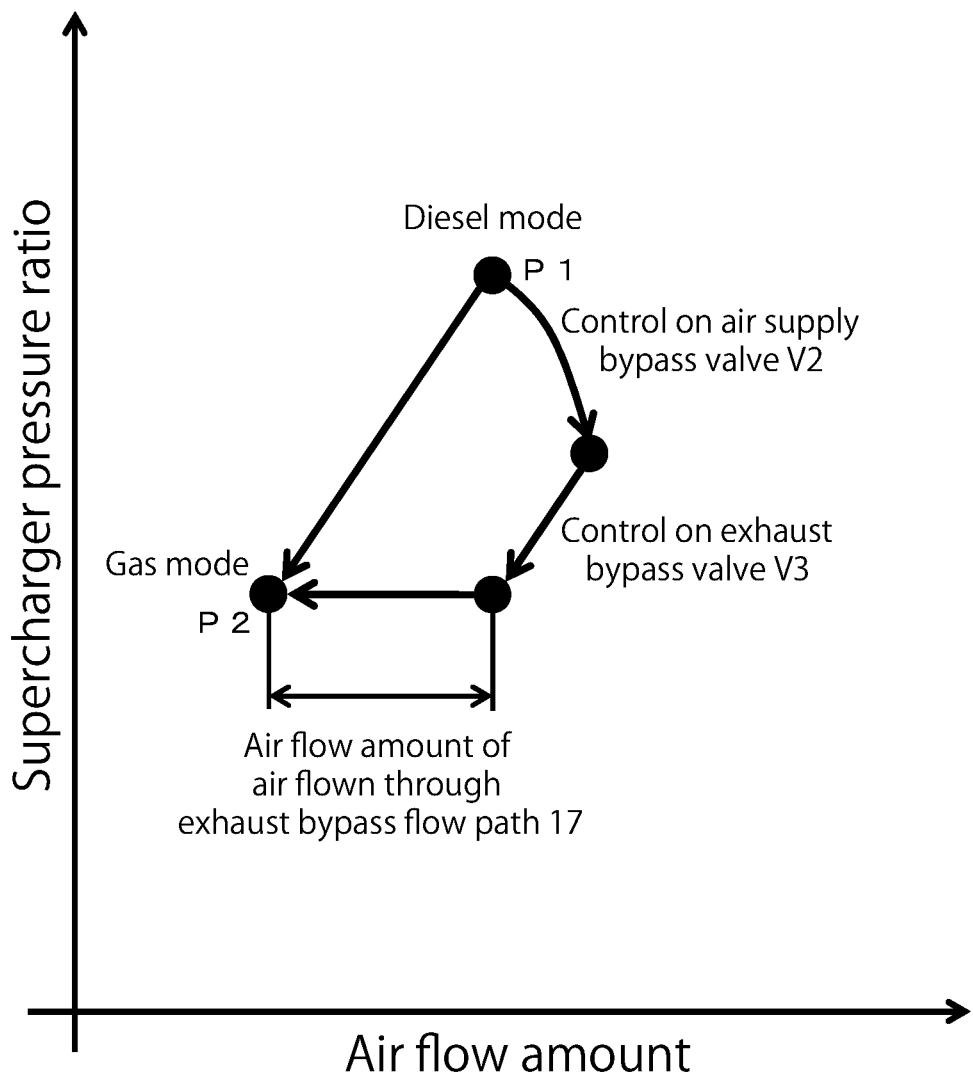
FIG. 7 is a diagram illustrating a relation between a pressure ratio and an air flow amount in a supercharger of the engine device.

The supercharger 49 has a capacity associated with the engine device 21 with its operation in the diesel mode. Thus, when the engine device 21 operates in the gas mode, the capacity of the supercharger 49 is needed to be associated with the engine device 21 with its operation in the gas mode on a pseudo basis. In FIG. 7, a relationship between a pressure ratio (a ratio of a discharge pressure value relative to an intake pressure value in relation to the compressor 49b) and an air flow amount (a discharge flow amount in relation to the compressor 49b or a flow amount of air supplied to the intake manifold 67). As shown in FIG. 7, in the case where the engine load is the same, a compression ratio and an air flow amount at an operation point P2 in the gas mode are respectively lower than a compression ratio and an air flow amount at an operation point P1 in the diesel mode.

When the diesel engine 21 has switched its operation from the diesel mode to the gas mode, in the case where only the exhaust bypass valve V3 is controlled to make a change between the operation points, the exhaust bypass valve V3 is caused to open to decrease the rotation number of the turbine 49a so as to reduce the compression ratio and the air flow amount of the compressor 49b. In this case, as shown in FIG. 7, the vector quantity of the operation point P1 in the diesel mode and the vector quantity of the operation point P2 in the gas mode are large, and thus, it takes a long time to complete the change to the gas mode.

Meanwhile, in the case where both of the air supply bypass valve V2 and the exhaust bypass valve V3 are controlled to make a change between the operation points, the air supply bypass valve V2 is caused to open to bypass the compressed air discharged from the compressor 49b to the inlet port of the compressor 49b via the air supply bypass flow path 17, and simultaneously, the exhaust bypass valve V3 is caused to open to decrease the rotation number of the turbine 49a. That is, the feedback of the compressed air from the discharge outlet to the intake inlet of the compressor 49b through the air supply bypass flow path 17 decreases the compression ratio of the compressor 49b, as shown in FIG. 7. With this configuration, therefore, an amount of the decrease of the compression ratio of the compressor 49b by the control of the exhaust bypass valve V3 is reduced, and this reduction of the amount of the decrease of the compression ratio shortens a switching time taken to perform the switching to the operation point in the gas mode.

Next, the detailed configuration of the dual-fuel engine 21 (the engine device 21), having such an outline configuration as described above, will be described with reference to FIGS. 8 to 20. In the following description, position relations among front, rear, left, and right directions in the configuration of the engine device 21 are specified on the assumption that its side coupled to the reduction gear 22 is its rear side.

As shown in FIGS. 8 to 15, the engine device 21 includes the engine output shaft 24 in the cylinder block 25, which is installed on the base table 17 (see FIG. 2), and a plurality of cylinder heads 26 mounted on the cylinder block 25. Further, a plurality of head covers 40 are arranged in one row in a front-rear direction so as to be each mounted on a corresponding one of the cylinder heads 26. The engine device 21 is configured such that, on the right side face of a row of the cylinder heads 26, a gas manifold (gas fuel pipe) 41 is disposed so as to extend in parallel to the row of the head covers 40, whereas, on the left side face of the cylinder block 25, fuel oil pipes (liquid fuel pipes) 42 are disposed so as to extend in parallel to the row of the head covers 40, and side covers 43 are disposed so as to cover the fuel oil pipes 42. Further, the exhaust manifold (exhaust flow path) 44, which will be described later, is disposed so as to extend in parallel to the row of the head covers 40 at the upper side of a gas manifold 41, and the periphery of the exhaust manifold 44 is covered by heat shield covers 45.

A supra-cylinder head cooling water pipe 46 is disposed between the row of the head covers 40 and the heat shield covers 45 so as to extend in parallel to the row of the head covers 40. The cooling water pipe 46 is coupled to cooling water paths inside the cylinder heads 26. A common rail (pilot fuel pipe) 47 is disposed above the cooling water pipe 46 so as to extend in parallel to the row of the head covers 40, just like the cooling water pipe 46. In this case, the cooling water pipe 46 is coupled to and supported by the cylinder heads 26, and the common rail 47 is coupled to and supported by the cooling water pipe 46. Further, the heat shield covers 45 are coupled to and supported by the cooling water pipe 46 and the cylinder block 25.

The front end (exhaust outlet side) of the exhaust manifold 44 is coupled to the supercharger 49 via an exhaust relay pipe 48. Accordingly, the exhaust gas discharged through the exhaust manifold 44 is flown into the turbine 49a of the supercharger 49 via the exhaust relay pipe 48 to rotate the turbine 49a, and this rotation of the turbine 49a rotates the compressor 49b including the same shaft as that of the turbine 49a. The supercharger 49 is disposed at the upper side of the front end of the engine device 21, and respectively includes the turbine 49a and the compressor 49b at the right side and the left side of the supercharger 49 itself. Further, an exhaust outlet pipe 50 is disposed at the right side of the supercharger 49 and is coupled to the exhaust outlet of the turbine 49a so as to allow the exhaust gas from the turbine 49a to be discharged into the exhaust path 28 (see FIG. 2) through the exhaust outlet pipe 50 itself.

The intercooler 51, which cools the compressed air from the compressor 49b of the supercharger 49, is disposed blow the supercharger 49. That is, the intercooler 51 is disposed at the front end side of the cylinder block 25, and the supercharger 49 is mounted above the intercooler 51. The air discharge outlet of the compressor 49b is disposed at a left-right direction center layer position of the supercharger 49 so as to communicate backward (i.e., toward the cylinder block 25 side). Meanwhile, an upwardly communicating air intake inlet is disposed on the upper face of the intercooler 51, and through this air intake inlet, the compressed air discharged from the compressor 49b is flown into the intercooler 51. Further, the air discharge outlet of the compressor 49b and the air intake inlet of the intercooler 51 communicate with each other through an intake relay pipe 52 with its ends coupled to them. This intake relay pipe 52 includes the main throttle valve V1 described above (see FIG. 5).

On the front end face (the front side face) of the engine device 21, a cooling water pump 53, a pilot fuel pump 54, a lubricant oil pump (priming pump) 55, and a fuel oil pump 56 are disposed at the outer circumference side of the engine output shaft 24. In this case, the cooling water pump 53 and the fuel oil pump 56 are respectively disposed at an upper portion and a lower portion that are near the left side face, and the pilot fuel pump 54 and the lubricant oil pump 55 are respectively disposed at an upper portion and a lower portion that are near the right side face. Further, a rotation transmission mechanism (omitted from illustration) for transmitting the rotation power of the engine output shaft 24 is disposed in the front end portion of the engine device 21. With this configuration, the rotation power from the engine output shaft 24 is transmitted via the above rotation transmission mechanism, and this transmitted rotation power rotates the cooling water pump 53, the pilot fuel pump 54, the lubricant oil pump 55, and the fuel oil pump 56, which are disposed at the outer circumference of the engine output shaft 24. Moreover, in the inside of the cylinder block 25, a camshaft (omitted from illustration) whose shaft is directed in the front-rear direction is rotatably supported at a portion above the cooling water pump 53, and the rotation power of the engine output shaft 24 is also transmitted to the camshaft via the above rotation transmission mechanism to rotate the camshaft.

An oil pan 57 is disposed below the cylinder block 25, and lubrication oil flowing through the cylinder block 25 is accumulated in this oil pump 57. The lubricate pump 55 is configured to allow its lower side suction inlet to be coupled to the oil pan 57 via a lubricant oil pipe to suck the lubrication oil accumulated in the oil pan 57. Further, the lubricant oil pump 55 is configured to allow its upper discharge outlet to be coupled to a lubricant oil inlet of a lubricant oil cooler 58 via a lubricant oil pipe to supply the lubrication oil having been sucked from the oil pan 57 to the lubricant oil cooler 58. The lubricant oil cooler 58 respectively includes a lubricant oil inlet and a lubricant oil outlet at the front side and the rear side of the lubricant oil cooler 58 itself, and allows the lubricant oil outlet to be coupled to a lubricant oil filter 59 via a lubricant oil pipe. The lubricant oil filter 59 respectively includes a lubricant oil inlet and a lubricant oil outlet at the front side and the rear side of the lubricant oil filter 59 itself, and allows the lubricant oil outlet to be coupled to the cylinder block 25. Accordingly, lubricant oil flown from the lubricant oil filter 55 is cooled by the lubricant oil cooler 58, and then is purified by the lubricant oil filter 59.

The lubricant oil cooler 58 and the lubricant oil filter 59 are fixed to the right side face of the cylinder block 25. Further, the lubricant oil cooler 58 and the lubricant oil filter 59 are disposed in series in the front-rear direction on the right side face of the cylinder block 25 so as to allow the lubricant oil cooler 58 to be anteriorly located (i.e., located at the lubricant oil pump 55 side). Further, a cylinder block right-side cooling water pipe 60 extends in the front-rear direction, and is disposed at a position between the gas manifold 41 and the lubricant oil cooler 58 so as to be distanced from the right side face of the cylinder block 25. This cooling water pipe 60 is disposed so as to extend along the gas manifold 41 from the front side of the cylinder block 25 up to a position between the lubricant oil cooler 58 and the lubricant oil filter 59.

Further, the cooling water pipe 60, which is disposed so as to extend along the gas manifold 41, is coupled to an intercooler discharge side cooling water pipe 61, through which cooling water discharged from the intercooler 51 is flown, and the cooling water discharged from the intercooler 51 is supplied to the lubricant oil cooler 58. Further, the intercooler 51 is configured to allow the discharge side cooling water pipe 61 and a water supply side cooling water pipe 62 to be respectively disposed at an upper portion and a lower portion on the right side face of the intercooler 51 itself, and allows the discharge side cooling water pipe 61 and the water supply side cooling water pipe 62 to be inserted into the intercooler 51 itself to cool the compressed air from the compressor 49b of the supercharger 49.

The supercharger 49 rotatably supports the compressor 49b and the turbine 49a. The compressor 49b and the turbine 49a include the same shaft, and are respectively separated to and disposed at a left portion and a right portion of the supercharger 49. Further, the exhaust gas discharged through the exhaust manifold 44 is introduced into the turbine 49a via the exhaust relay pipe 48 to rotate the turbine 49a, and this rotation of the turbine 49a rotates the compressor 49b. Further, the supercharger 49 includes an intake filter 63 and a fresh-air path pipe 64 at a fresh-air intake side, that is, at the left side of the compressor 49b. The intake filter 63 purifies introduced outside air. The fresh-air path pipe 64 couples the intake filter 63 to the compressor 49b. With this configuration, the rotation of the compressor 49b in synchronization with the rotation of the turbine 49a introduces outside air (fresh air) having been sucked by the intake filter 63 into the compressor 49b itself via the supercharger 49. Further, the compressor 49b compresses the sucked air having been introduced from its left side, and then discharges resultant compressed air into the intake relay pipe 52, which is disposed at the rear side of the compressor 49b.

The intake relay pipe 52 includes an upper front-side opening coupled to a discharge outlet on the rear face of the compressor 49b via a bellows pipe 65, whereas the intake relay pipe 52 includes a lower-side opening coupled to an intake inlet on the upper face of the intercooler 51. Further, the intercooler 51 is coupled to one end of an air supply bypass pipe 66 (the air supply bypass flow path 17) at a branch port provided in a ventilation path disposed on the front face of the intercooler 51 so as to allow part of the compresses air having been cooled by the intercooler 51 to be discharged into the air supply bypass pipe 66. The other end of the air supply bypass pipe 66 is coupled to a branch port provided on the front face of the fresh-air path pipe 64 to allow part of the compressed air having been cooled by the intercooler 51 to be flown back to the fresh-air path pipe 64 via the air supply bypass pipe 66 and to join outside air from the intake filter 63. Further, the air supply bypass pipe 66 includes the air supply bypass valve V2 in its halfway portion.

The intercooler 51 is configured to, when, from its left rear side, the compressed air from the compressor 49b is flown in through the intake relay pipe 52, cool the compressed air from the compressor 49b on the basis of a heat exchange with cooling water supplied from a water supply pipe 62. In the inside of the intercooler 51, the compressed air having been cooled in its left chamber is flown into the ventilation path, disposed on its front face, to be introduced into its right chamber, and then is discharged into the intake manifold 67 through a discharge outlet disposed at the rear side of the right chamber. The intake manifold 67 is disposed on the right side face of the cylinder block 25, and is disposed so as to extend in parallel to the row of the head covers 40 below the gas manifold 41. The flow amount of compressed air flown back from the intercooler 51 to the compressor 49b is determined in accordance with the opening degree of the air supply bypass valve V2, and this determination of the flow amount of the flown-back compressed air results in a setting of a flow amount of the compressed air supplied to the intake manifold 67.

Further, the supercharger 49 includes a rear-side intake inlet coupled to the exhaust relay pipe 48 and a right-side discharge outlet coupled to the exhaust outlet pipe 50. With this configuration, the supercharger 49 allows the exhaust gas from the exhaust manifold 44 to be introduced into the gas turbine 49a via the exhaust relay pipe 48 to allow the introduced exhaust gas to rotate the turbine 40a and, simultaneously, allow this rotation of the turbine 40a to rotate the compressor 49b. Further, the supercharger 49 allows the exhaust gas to be discharged to the exhaust path 28 (see FIG. 2) through the exhaust outlet port 50. The exhaust relay pipe 48 includes its rear-side opening coupled to the discharge outlet of the exhaust manifold 44 via a bellows pipe 68, whereas the exhaust relay pipe 48 includes its front-side opening coupled to the rear-side intake inlet of the turbine 49a.

Further, at a halfway position of the exhaust relay pipe 48, a branch port is disposed on its right side face, and this branch port of the exhaust relay pipe 48 is coupled to one end of an exhaust bypass pipe 69 (the exhaust bypass flow path 18). The exhaust bypass pipe 69 allows its another end to be coupled to a junction port disposed at the rear side of the exhaust outlet pipe 50 to allow part of the exhaust gas discharged from the exhaust manifold 44 to be bypassed to the exhaust outlet pipe 50 not through the supercharger 49. Further, the exhaust bypass pipe 69 includes the exhaust bypass valve V3 in its halfway portion. An flow amount of the exhaust gas bypassed from the exhaust manifold 44 to the exhaust outlet pipe 50 is set in accordance with the opening degree of the exhaust bypass valve V3, and this setting of the flow amount of the bypassed exhaust gas results in an adjustment of the flow amount of the exhaust gas supplied to the turbine 49a. Further, the exhaust bypass pipe 69 includes a bellows pipe 70 at a position between the exhaust bypass valve V3 and a coupling portion coupled to the exhaust relay pipe 48.

A machine-side operation control device 71 is secured to the left side face of the intercooler 51 via a support stay (support member) 72. This machine-side control device 71 controls stating/stopping, and any other action of the engine device 21, and includes switches for receiving starting/stopping operation by a worker, and a display for displaying the states of individual portions of the engine device 21. An engine starting device 75 is secured to a rear end side portion on the left side face of the cylinder block 25, and this engine starting device 75 performs operation to start up the engine device 21.

Further, the engine control device 73, which controls the operations of individual portions of the engine device 21, are secured to the rear end face of the cylinder block 25 via a support stay (support member) 74. A flywheel 76 is disposed at the rear end side of the cylinder block 25, and the engine control device 73 is disposed above the flywheel 76. This flywheel 76 rotates in conjunction with the reduction gear 22. The engine control device 73 is electrically coupled to sensors (pressure sensors and temperature sensors) disposed at individual portions of the engine device 21 to collect temperature data, pressure data, and any other measurement data having been measured at the individual portions of the engine device 21. Further, the engine control device 73 sends signals to electro-magnetic valves, and any other component disposed at individual portions of the engine device 21 to control various operations (a fuel oil injection, a pilot fuel injection, a gas injection, a cooling water temperature adjustment, and any other operation).

The cylinder block 25 includes a step portion at the upper side of the left side face of the cylinder block 25 itself, and the fuel injection pumps 89, the number of which is the same as that of the head covers 40 and that of the cylinder heads 26, are disposed on the upper face of the step portion 25a of the cylinder block 25. The fuel injection pumps 89 are arranged in one row along the left side face of the cylinder block 25. Further, the left side face of each of the fuel injection pumps 89 is coupled to the fuel oil pipes (liquid fuel pipes) 42, and the upper end of each of the fuel injection pumps 89 is coupled to the left side face of a corresponding one of the cylinder heads 26 that is located at the front right side of the each fuel injection pump 89 via a corresponding one of fuel discharge pipes 90. The fuel oil pipes 42 are constituted of two upper and lower pipes, one being an oil supply pipe for supplying fuel oil to the fuel injection pumps 89, the other one being an oil return pipe for returning fuel oil from the fuel injection pumps 89. Further, each of the fuel discharge pipes 90 is coupled to a corresponding one of the main fuel injection valves 79 via a fuel flow path inside a corresponding one of the cylinders 26 to supply the fuel oil from a corresponding one of the fuel injection pumps 89 to the corresponding one of the main fuel injection valves 79.

Figure 9:
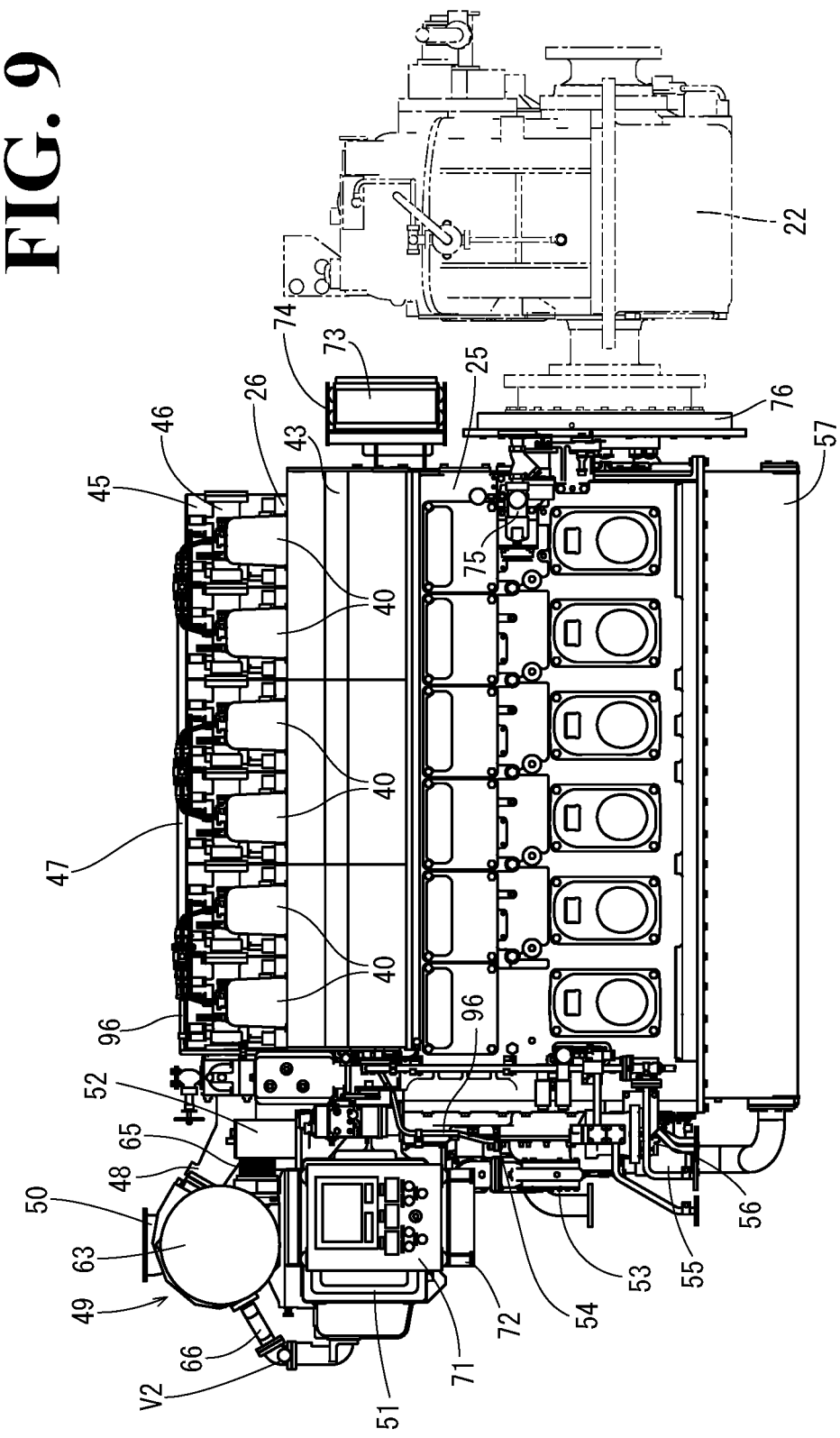
FIG. 9 is a left side view of the engine device.
Figure 10:
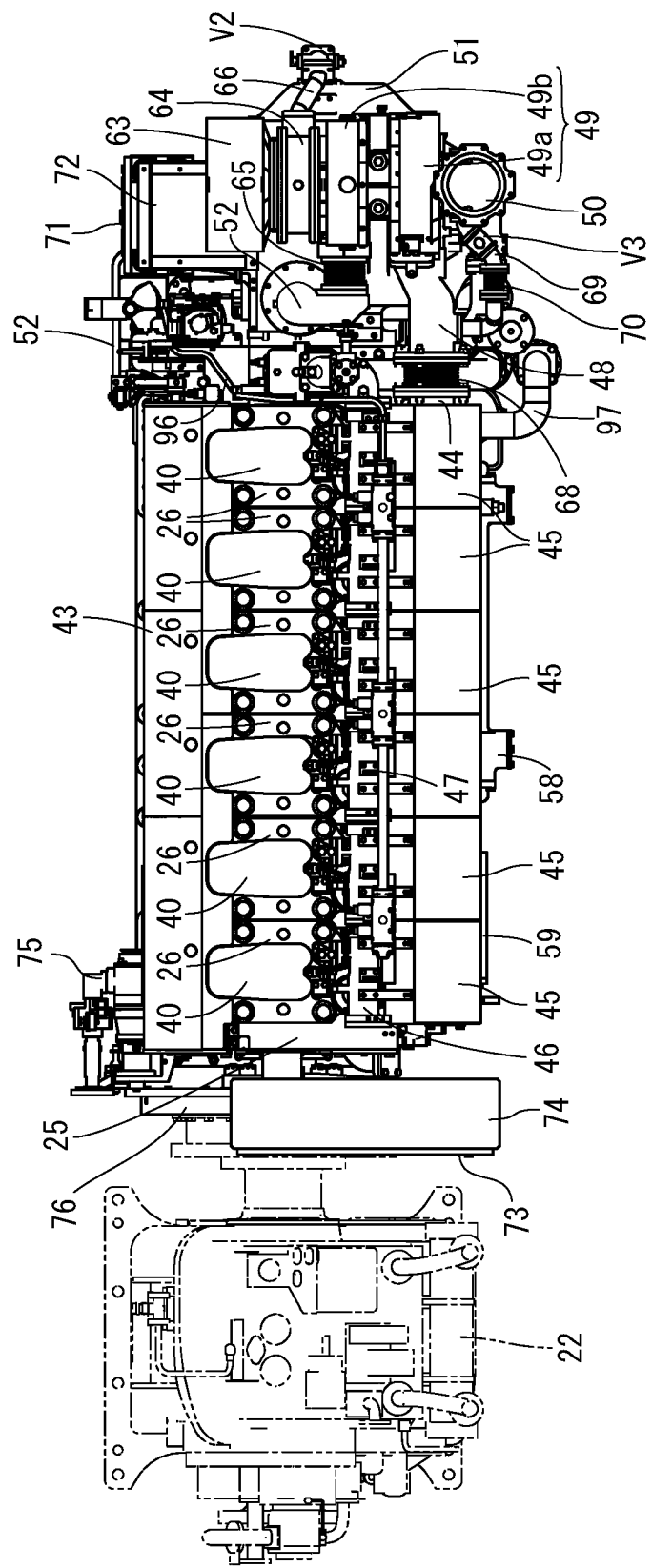
FIG. 10 is a plan view of the engine device.
Figure 11:
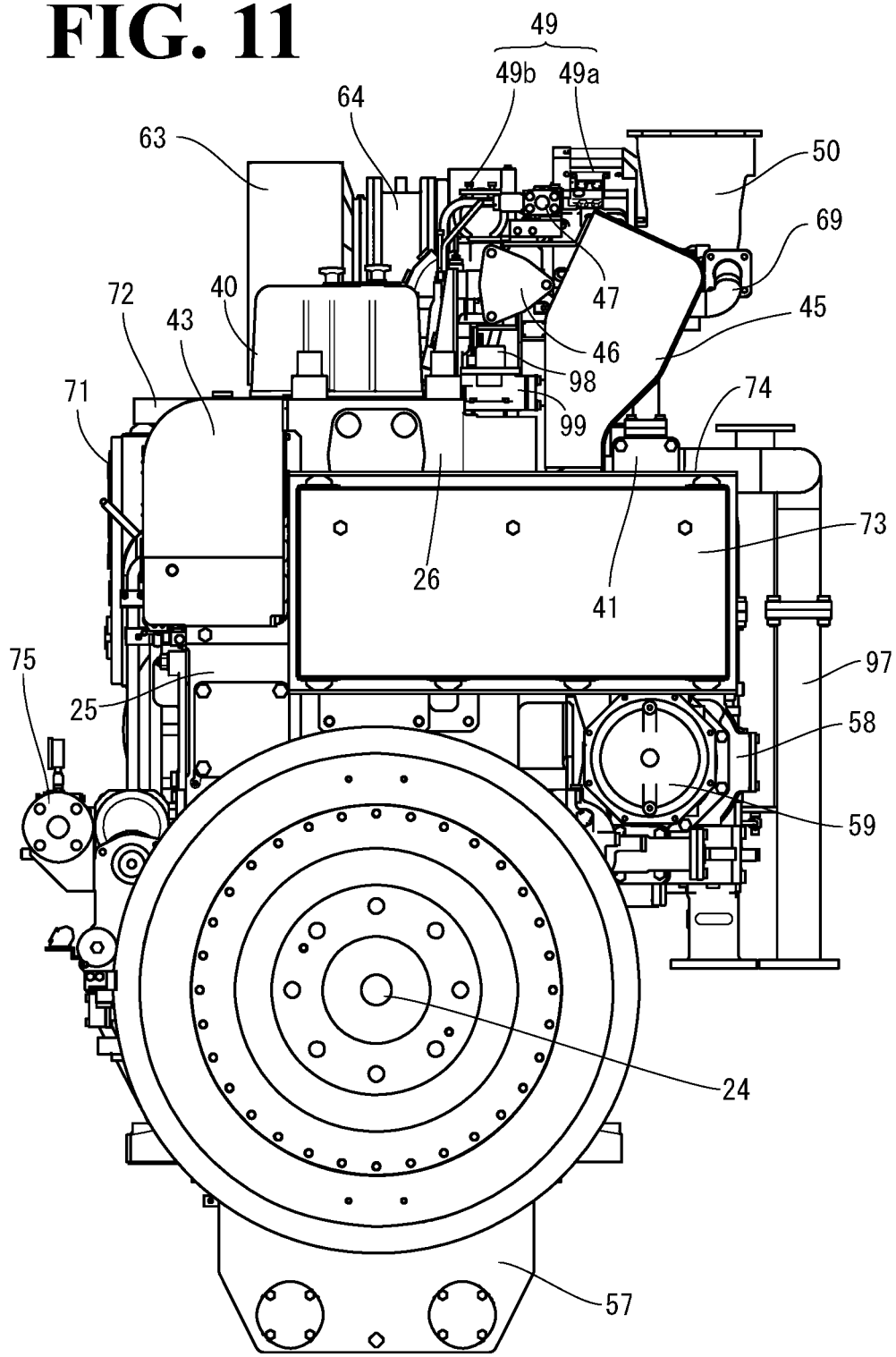
FIG. 11 is a rear view of the engine device.
Figure 12:
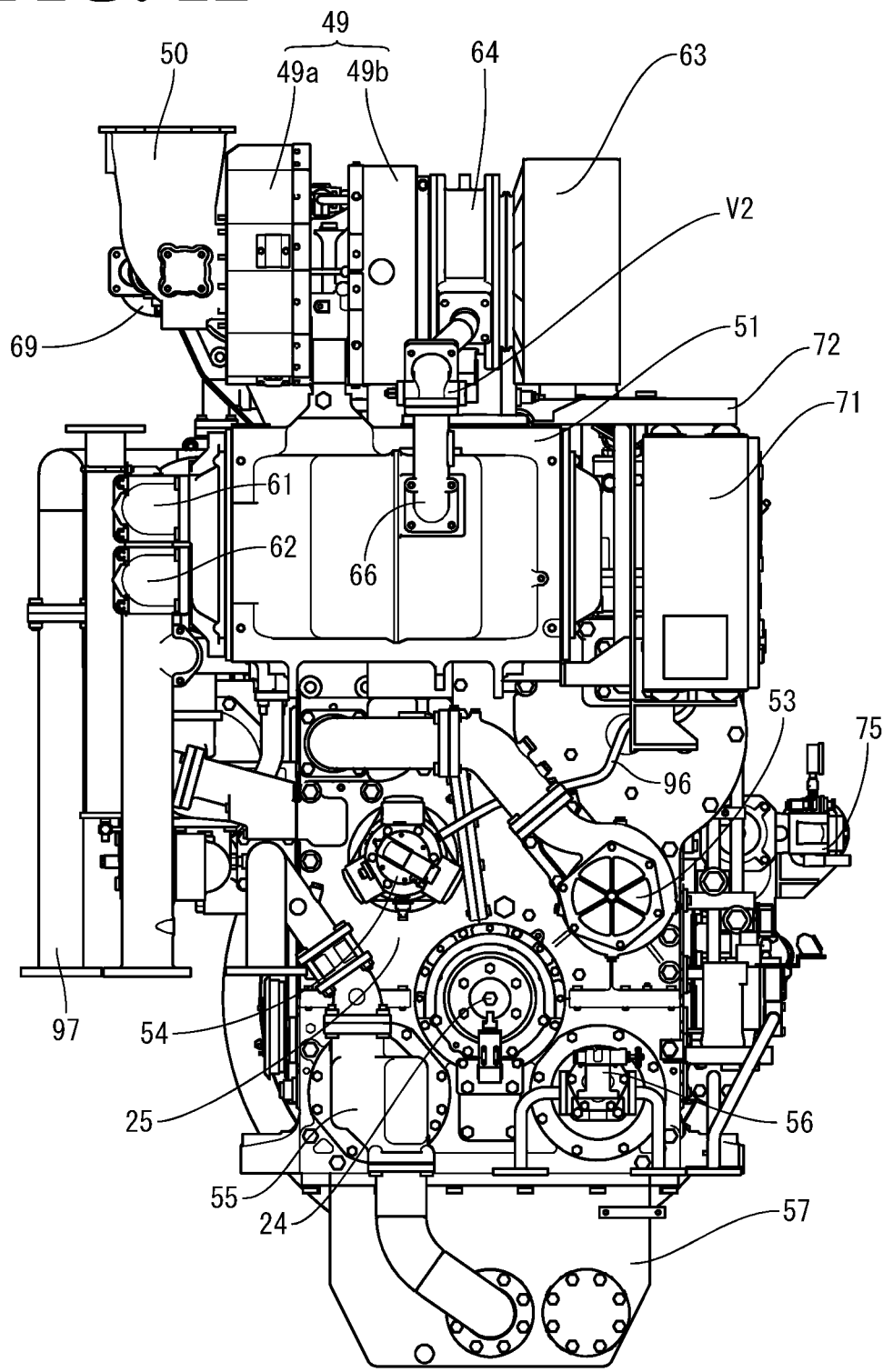
FIG. 12 is a front view of the engine device.

The fuel injection pumps 89 are arranged at the left side of and in parallel to the row of the head covers 40 on the step portion of the cylinder block 25 such that each of the fuel injection pumps 89 is located at the rear left side of a corresponding one of the cylinder heads 26 that is coupled to the each fuel injection pump 89 via a corresponding one of the fuel discharge pipes 90. Further, the fuel injection pumps 89 are arranged in one row at positions sandwiched by the cylinder heads 26 and the fuel oil pipes 42. As shown in FIGS. 9 to 11, the fuel injection pumps 89 are covered together with the fuel oil pipes 42 by the side covers 43, which are disposed on the step portion 25a of the cylinder block 25. Each of the fuel injection pumps 89 allows rotation of a pump cam in the camshaft (omitted from illustration) inside the cylinder block 25 to cause a push-up operation of a plunger. Further, each of the fuel injection pumps 89 allows the push-up operation of the plunger to raise pressure of the fuel oil supplied from one of the fuel oil pipes 42 to a high pressure level, and then allows resultant high-pressure fuel oil to be supplied to a corresponding one of the main fuel injection valves 79 via a corresponding one of the fuel discharge pipes 90.

As shown in FIGS. 9 and 12 to 15, the front edge of the common rail 47 is coupled to the discharge side of the pilot fuel pump 54 via a pilot fuel relay pipe 96 to allow pilot fuel discharged from the pilot fuel pump 54 to be supplied to the common rail 47. The pilot fuel relay pipe 96 has a shape configured to, in order to allow a discharge outlet of the pilot fuel pump 54 to be coupled to the front end of the common rail 47, extend from the discharge outlet of the pilot fuel pump 54 toward the upper side of the left side face of the cylinder block 25, and then bend to extend, on the front end face of the row of the cylinder heads 26, from the left side face of the row of the cylinder heads 26 toward the front end of the common rail 47.

Figure 8:
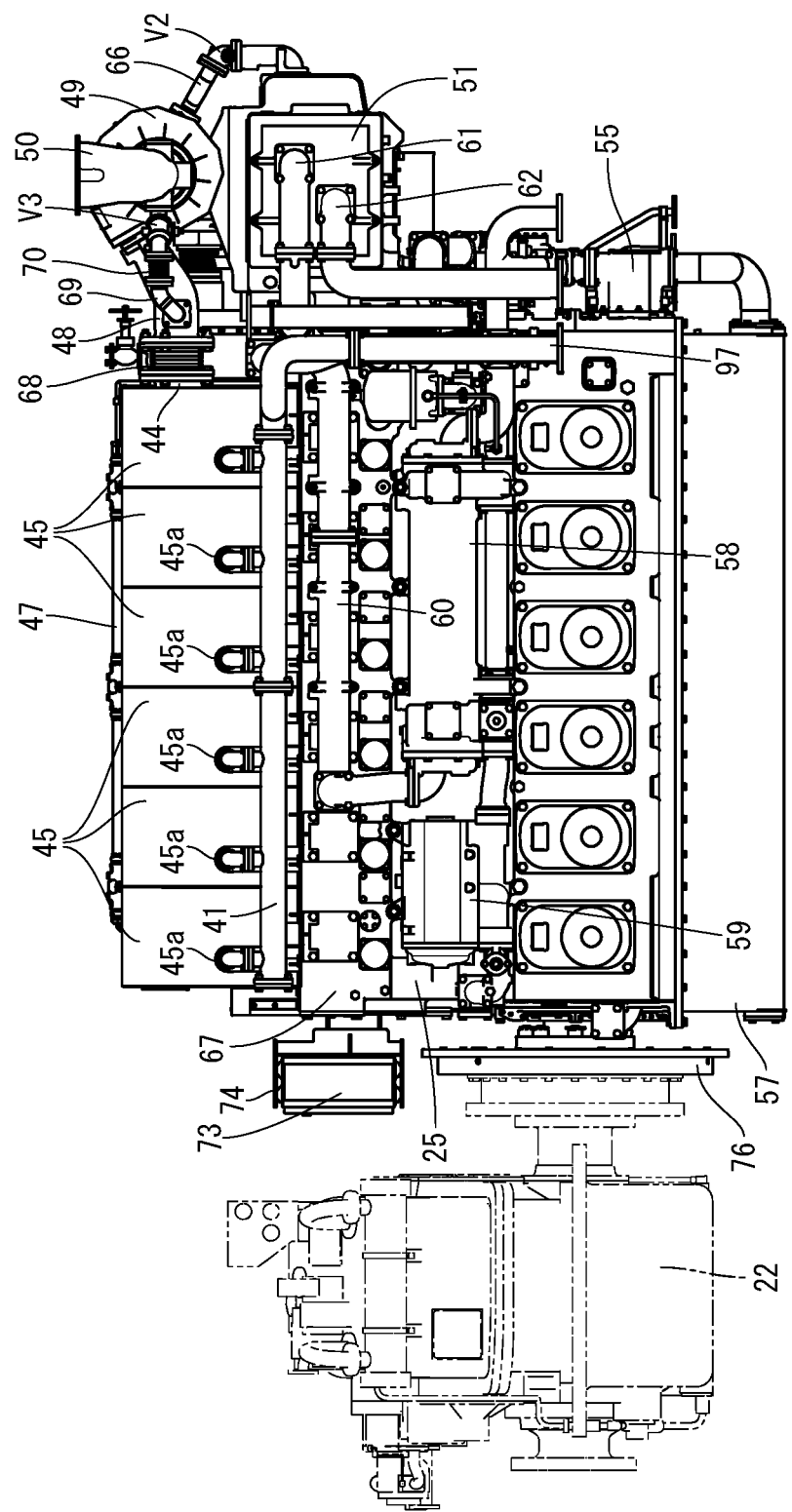
FIG. 8 is a right side view of an engine device according to an embodiment of the present invention.
Figure 13:
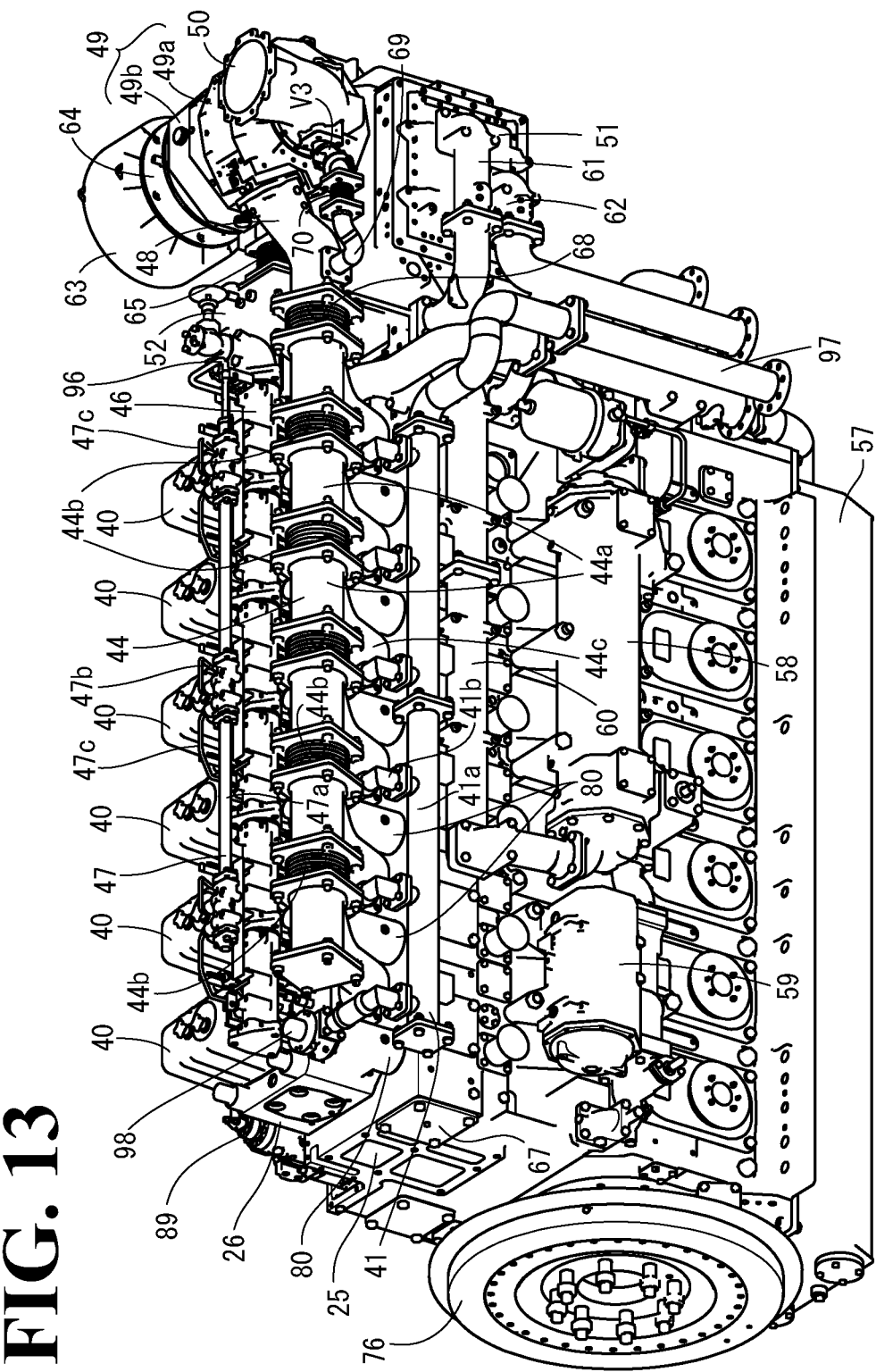
FIG. 13 is a perspective view of the engine device illustrating a configuration of an exhaust manifold installation side (right side) of the engine device.
Figure 14:
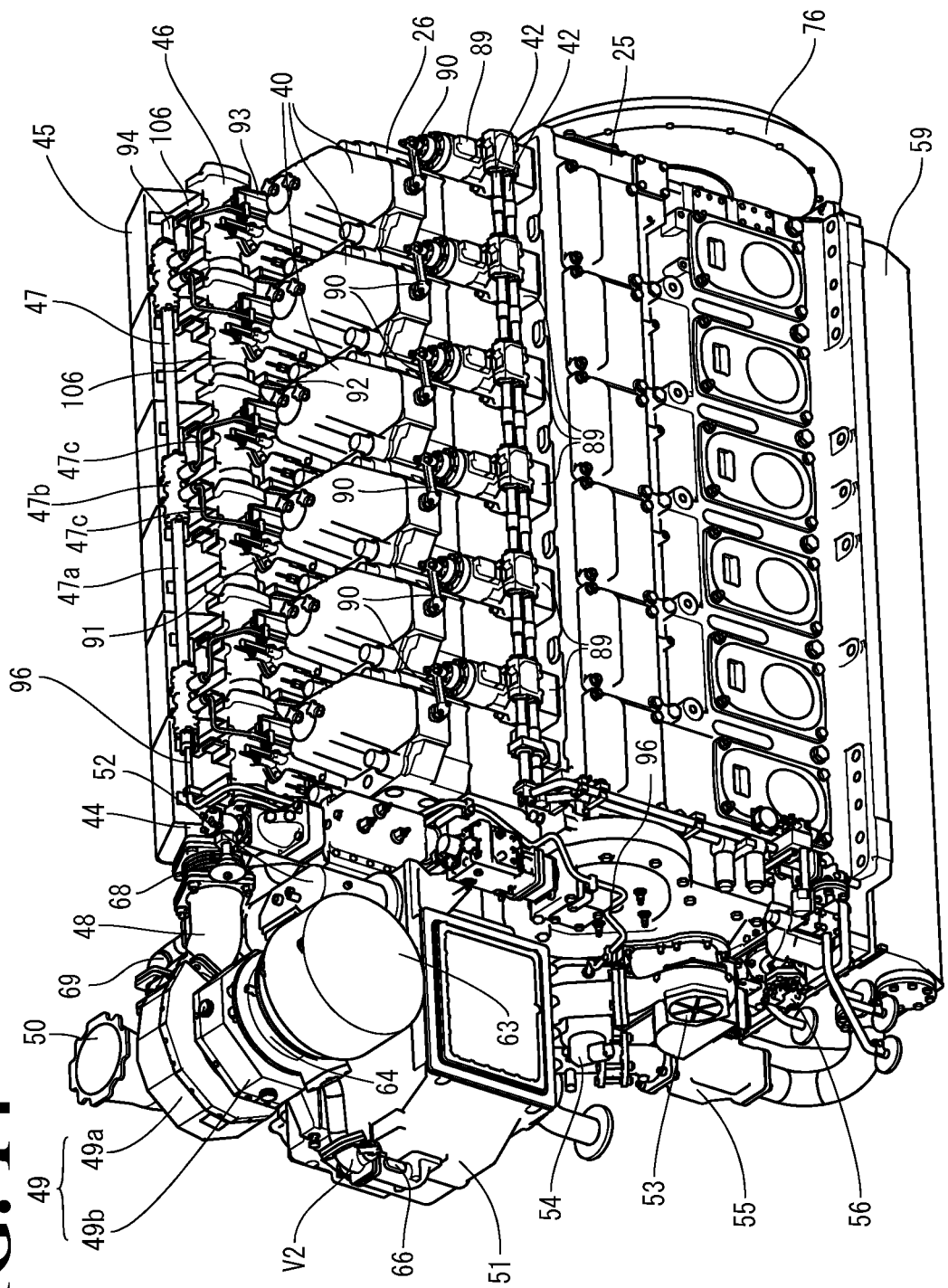
FIG. 14 is a perspective view of the engine device illustrating a configuration of a fuel injection pump installation side (left side) of the engine device.
Figure 15:
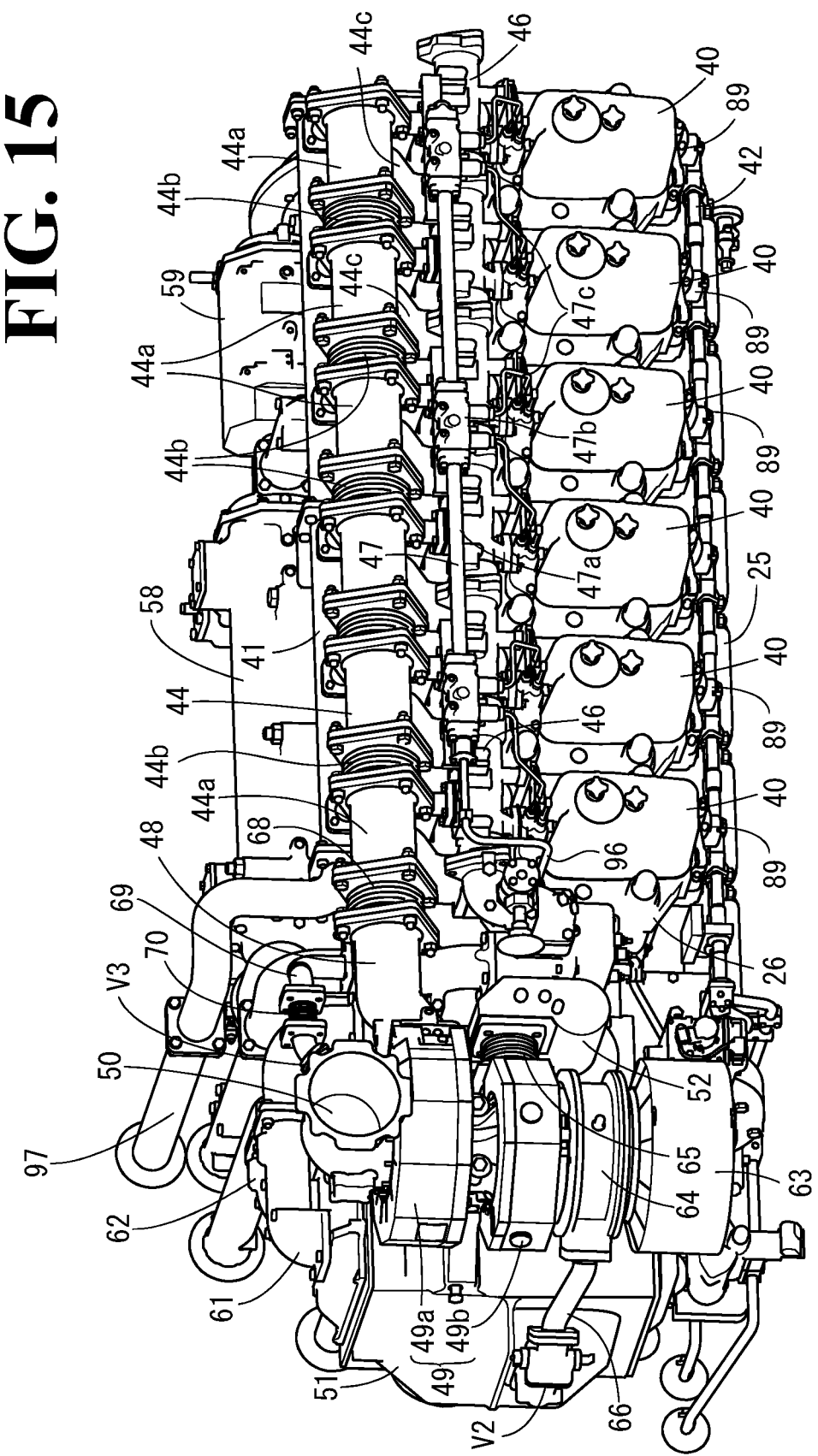
FIG. 15 is a perspective view of the engine device when viewed from an upper side of a supercharger installation side (upper front side) of the engine device.

As shown in FIGS. 8, 13, and 15, the gas manifold 41 is coupled to a gas inlet pipe 97 at the front side of the right side face of the cylinder block 25 so as to be supplied with fuel gas in a pressed state. The gas inlet pipe 97 is one of gas supply paths coupled to the gas valve unit 35 (see FIG. 4). That is, the front end of the gas manifold 41 is coupled to the gas inlet pipe 97 to allow fuel gas from the gas valve unit 35 to be supplied to the gas manifold 41. The gas manifold 41 is disposed so as to extend along the row of the head covers 40 at a height-direction position where the gas manifold 41 is interposed between the exhaust manifold 44 and the intake manifold 67

The gas manifold 41 includes a gas main pipe 41a and a plurality of gas branch pipes 41b. The front end of the gas main pipe 41a extends in the front-rear direction and is coupled to the gas inlet pipe 97. The plurality of branch pipes 41b are branched from the upper face of the gas main pipe 41a toward the cylinder head 26. The gas main pipe 41a includes coupling flanges on its upper face at equal distance intervals, and each of the coupling flanges is fastened to an inlet side flange of a corresponding one of the gas branch pipes 41b. For each of the gas branch pipes 41b, its end portion opposite a coupling portion coupled to the gas main pipe 41a is coupled to the right side face of a sleeve into which the gas injector 98 is inserted from the top side.

The gas main pipe 41a and the gas branch pipes 41b constitute the gas manifold 41, and the gas main pipe 41a and the gas branch pipes 41b are each formed of a double-wall pipe. Further, the gas inlet pipes 97 and the sleeves are also each formed of a double-wall pipe. That is, each of gas pipes laid at the downstream side of the gas valve unit 35 has a double-wall pipe structure in which an outer pipe encloses a highly pressed inner pipe, and this inner pipe (inner space) allows fuel gas to be flown toward each of the gas injectors 98 via the gas manifold 41. Further, each of the gas pipes laid at the downstream side of the gas valve unit 35 allows leaked fuel gas to be collected and sent to the gas valve unit 35 through a space between the outer pipe and the inner pipe (i.e., an outer space).

As shown in FIGS. 13 and 15, the exhaust manifold 44 allows exhaust main pipes 44a and bellows pipes 44b to be alternately arranged in one row and allows every pair of the exhaust main pipe and the bellows pipe to be coupled to each other. Further, the exhaust manifold 44 allows exhaust branch pipes 44c (each being one portion of the exhaust port 38) to be each branched from a lower side portion of a corresponding one of the exhaust main pipes 44a and coupled to the right side face of a corresponding one of the cylinder heads 26. The exhaust main pipes 44a and the exhaust branch pipes 44c are provided so as to allow the number of the exhaust main pipes 44a and the number of the exhaust branch pipes 44c to be the same as the number of the cylinder heads 26, and each of the exhaust branch pipes 44c is coupled to the front side of the right side face of a corresponding one of the cylinders 26. That is, in a front side portion of each of the cylinder heads 26, a corresponding one of exhaust valves 81 is disposed, and the exhaust inlet side of a corresponding one of the exhaust branch pipes 44c is coupled to the right side face of the each cylinder head 26. Further, the exhaust manifold 44 allows the exhaust inlet side flange of each of the exhaust branch pipes 44c to be fastened to the right side face of a corresponding one of the cylinder heads 26 so as to be supported by the cylinder heads 26.

As shown in FIGS. 8 and 13, the intake manifold 67 is disposed at the upper right side of the cylinder block 25 so as to extend in the front-rear direction at a position where a height-direction position of the intake manifold 67 is located below the gas manifold 41. Further, as shown in FIG. 13, for each of the cylinder heads 26, a rear portion of its right side face protrudes toward the gas manifold 41, and this protruding portion on the right side face results in an intake branch portion including in its inside an air flow path allowing the protruding portion to communicate with a portion lying directly on the intake manifold 67. That is, for each of the cylinder heads 26, its rear side portion where an intake valve 80 is disposed is coupled to the intake manifold 67 via the intake branch portion.

Next, air flow amount control in the case where the dual fuel engine 21 (the engine device 21) having the foregoing configuration operates in the gas mode will be described with reference to FIGS. 5, 6, and 16 to 19.

Figure 16:
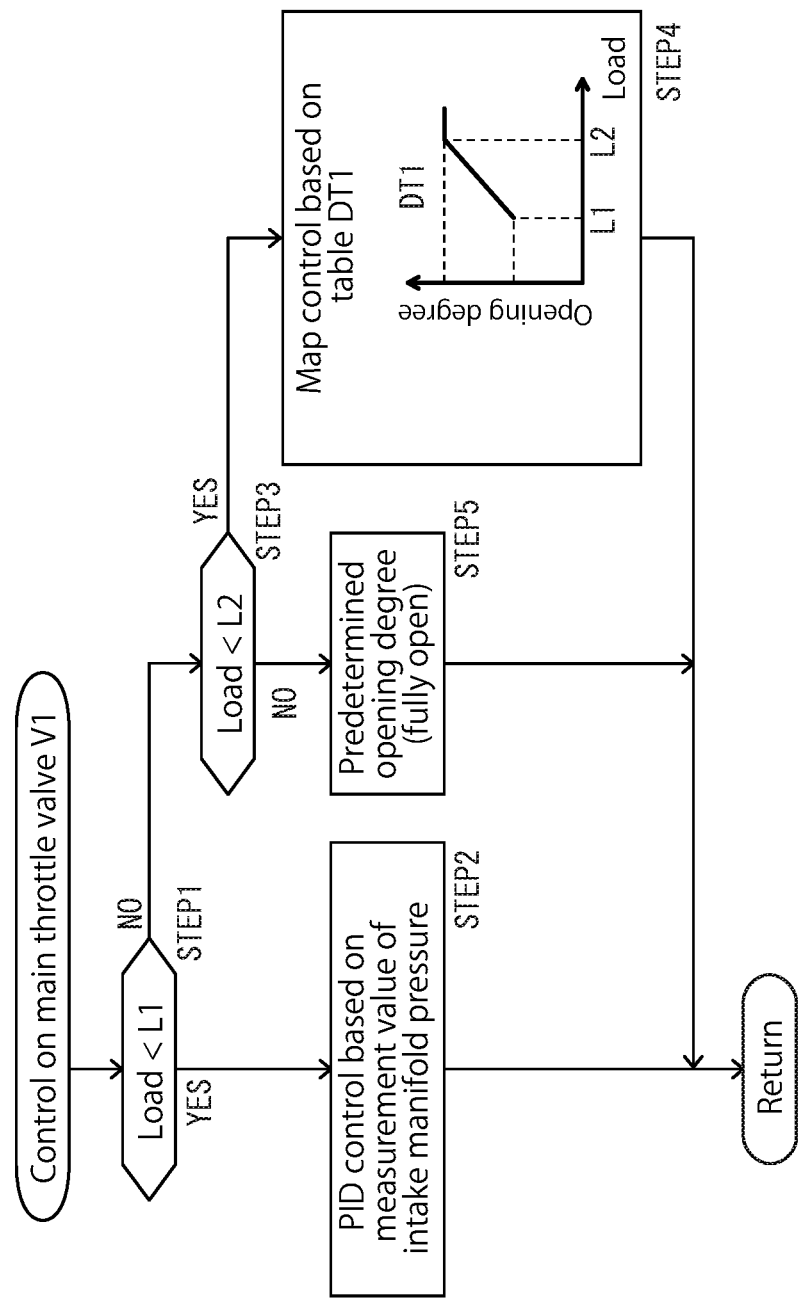
FIG. 16 is a flowchart illustrating control operation on a main throttle valve of an engine device according to an embodiment of the invention.

As shown in FIG. 16, in the case where an engine load falls within a low load range lower than a predetermined load L2, and is lower than a predetermined load L1 (L1<L2) (Yes at STEP 1), the engine control device 73 performs feedback control (PID control) on the opening degree of the main throttle valve V1. At this time, the engine control device 73 sets an intake manifold pressure target value (a target pressure value) adapted to the engine load. Further, upon receipt of a measurement signal from the pressure sensor 39, the engine control device 73 confirms an intake manifold pressure measurement value (a measured pressure value), and calculates a difference with the target pressure value. Subsequently, the engine control device 73 performs the PID control on a valve aperture of the main throttle valve V1 on the basis of the deference value between the target pressure value and the measured pressure value to cause an air pressure value of the intake manifold 67 to approximate the target pressure value.

In the case where the engine load falls within the low load range, and is higher than or equal to the predetermined load L1 (No at STEP 1 and Yes at STEP 3), the engine control device 73 performs the map control on the opening degree of the main throttle valve V1 (STEP 4). At this time, the engine control device 73 refers to a data table DT1 to set a valve aperture of the main throttle valve V1 into a valve aperture associated with the engine load. Here, the data table DT1 stores in itself valve apertures of the main throttle valve V1 that are each associated with a corresponding one of engine loads. Further, in the case where the engine load falls within the middle/high load range, which covers loads each being higher than or equal to the load L2, (No at STEP 3), the engine control device 73 performs control so as to cause the main throttle valve V1 to fully open.

Figure 17:
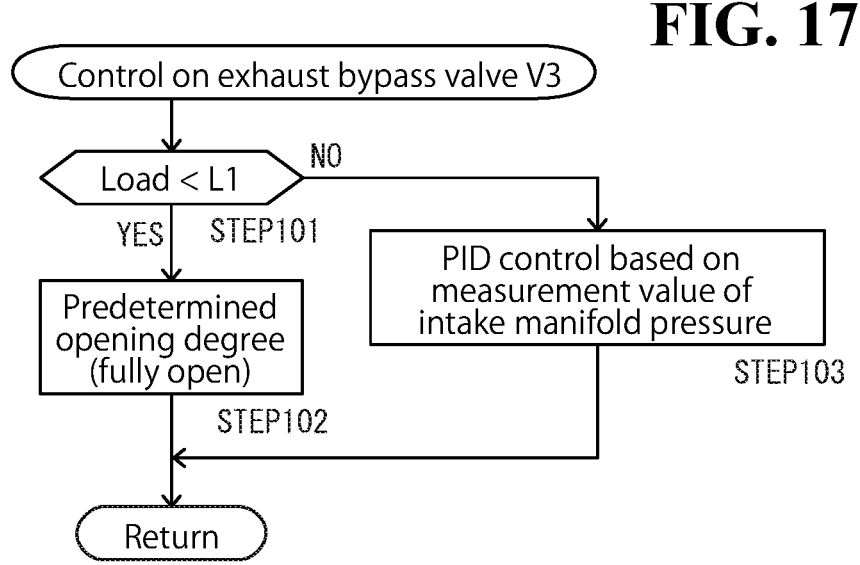
FIG. 17 is a flowchart illustrating control operation on an air supply bypass valve of the engine device.

As shown in FIG. 17, in the case where the engine load is lower than the predetermined load L1 (Yes at STEP 101), the engine control device 73 performs control so as to cause the exhaust bypass valve V3 to fully open (STEP 102). In the case where the engine load is higher than or equal to the predetermined load L1 (No at STEP 101), the engine control device 73 performs the feedback control (PID control) on the opening degree of the exhaust bypass valve V3 (STEP 103). At this time, the engine control device 73 performs the PID control of a valve aperture of the exhaust bypass valve V3 on the basis of the difference value between a target pressure value adapted to the engine load and a measured pressure value from the pressure sensor 39 to cause an air pressure value of the intake manifold 67 to approximate the target pressure value.

Figure 18:
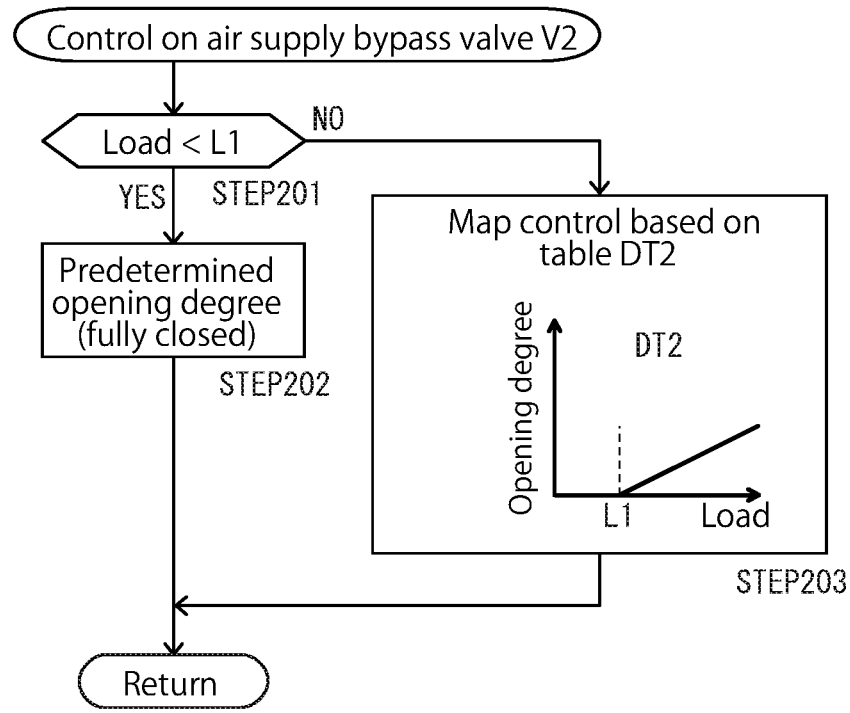
FIG. 18 is a flowchart illustrating control operation on an air supply throttle valve of the engine device.

As shown in FIG. 18, in the case where the engine load is lower than the predetermined load L1 (Yes at STEP 201), the engine control device 73 performs control so as to cause the air supply bypass valve V2 to fully open (STEP 202). In the case where the engine load is higher than or equal to the predetermined load L1 (No at STEP 201), the engine control device 73 performs the map control on the opening degree of the air supply bypass valve V2 (STEP 203). At this time, the engine control device 73 refers to a data table DT2 to set a valve aperture of the air supply bypass valve V2 into a valve aperture associated with the engine load. Here, the data table DT2 stores in itself valve apertures of the air supply bypass valve V2 that are each associated with a corresponding one of engine loads.

Figure 19:
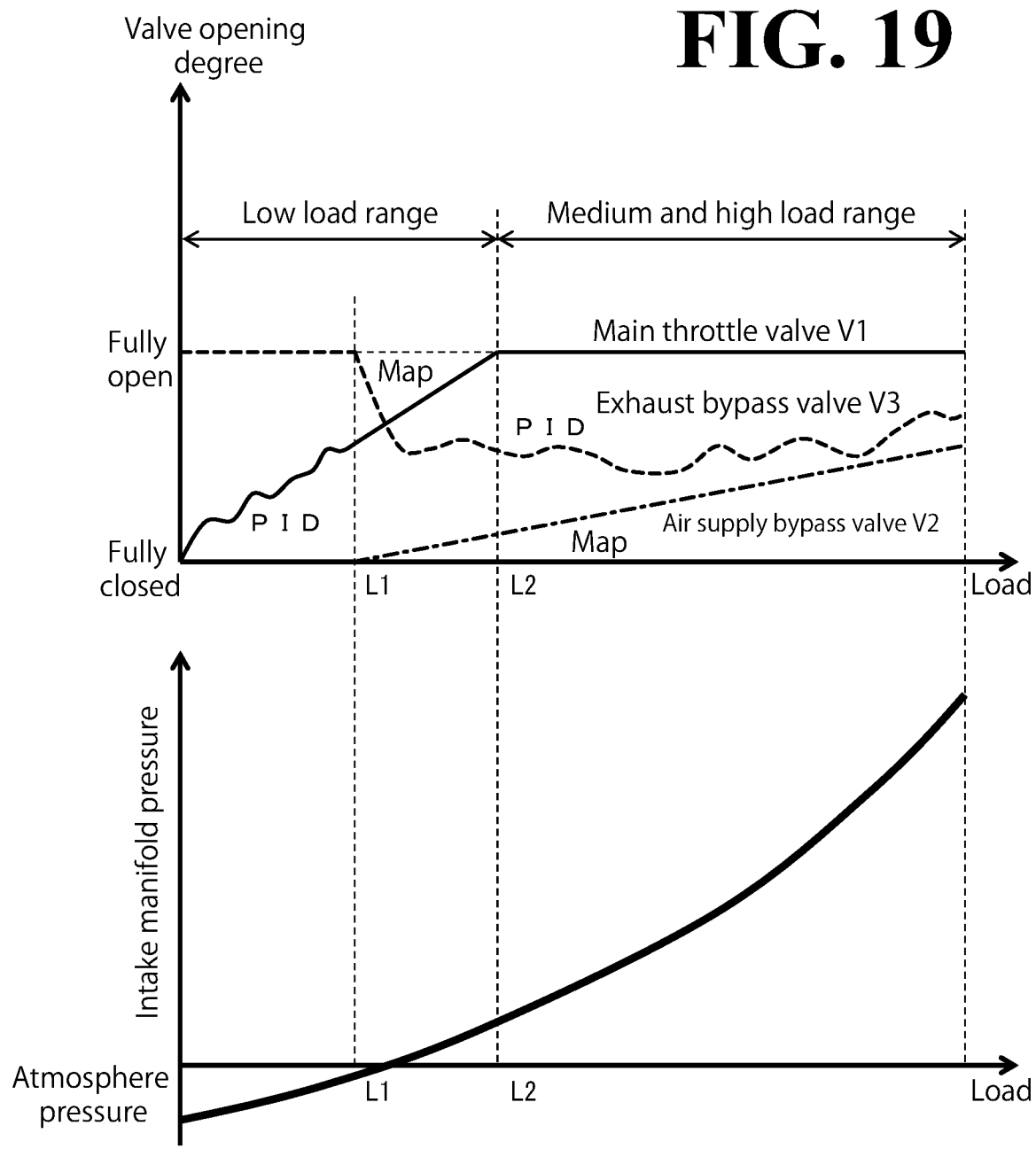
FIG. 19 is a diagram illustrating control of an air-fuel ratio relative to a load during a gas mode operation of the engine device.

As shown in FIG. 19, within the low load range, which covers loads each being lower than the load L2, in the case where the engine load is lower than the predetermined load L1 (L1<L2), the engine control device 73 performs the feedback control (PID control) based on an intake manifold pressure value having been measured by the pressure sensor 39 to set the opening degree of the main throttle valve V1. Further, in the case where the engine load is higher than the predetermined load L1, the engine control device 73 performs the map control based on the data table DT1 to set an aperture of the main throttle valve V1. Meanwhile, within the middle/high load range, which covers loads each being higher than or equal to the load L2, the main throttle V1 is caused to open with a predetermined aperture (fully open in this embodiment), and the air supply bypass valve V2 and the exhaust bypass valve V3 are each controlled to allow the intake manifold pressure to be adjusted to a target value adapted to the engine load.

In a state in which the supercharger 49 is optimized in accordance with a diesel mode specification, during an operation in the gas mode, even when the engine load falls within the middle/high load range within which operation points are largely different from those in the diesel mode, responsive control is realized in the pressure control on the intake manifold 67. Thus, during a load variation, the excess or deficiency of the amount of air needed for combustion is eliminated or minimized, and as a result, even when the engine device 21 operates using the supercharger 49, which is optimized in accordance with a diesel mode specification, the engine device 21 optimally operates in the gas mode.

Further, within the middle/high load range, an aperture of the exhaust bypass valve V3 is set through the feedback control (PID control) based on an intake manifold pressure value having been measured by the pressure sensor 39, and simultaneously, the opening degree of the air supply bypass valve V2 is set through the map control based on the data table DT1. Control of the aperture of the exhaust bypass valve V3 in accordance with the variation of an engine load realizes supplying the engine device 21 with air adapted to an air-fuel ratio needed for the combustion of gas fuel. Further, a combination with responsive control operation by the air supply bypass valve V2 increases a response speed needed to respond to a load variation in the gas mode.

Within the low load range, in the case where the engine load is higher than the predetermined load L1, an aperture of the exhaust bypass valve V3 is set through the feedback control (PID control) based on an intake manifold pressure value having been measured by the pressure sensor 39, and simultaneously, the opening degree of the air supply bypass valve V2 is set through the map control based on the data table DT2. Meanwhile, in the case where the engine load is lower than the predetermined load L1, the air supply bypass valve V2 is caused to be fully closed, and the exhaust bypass valve V3 is caused to fully open.

That is, when the exhaust manifold pressure becomes negative pressure, which is pressure lower than atmospheric pressure, the exhaust bypass valve V3 is caused to fully open to bring the drive of the turbine 49a to a halt. Thus, this configuration eliminates or minimizes surging in the supercharger 49 and any other undesired operation. Further, the control of causing the air supply bypass valve V2 to be fully closed realizes responsive control in the intake manifold pressure control by the main throttle valve V1 during a low load operation.

The engine device 21 includes, for each of the cylinders 36, the intake valve 80, the exhaust valve 81, the main fuel injection valve 79, and the gas injector 98. The intake valve 80 allows air to be taken into a main combustion chamber inside the each cylinder 36. The exhaust valve 81 allows exhaust gas to be discharged from the main combustion chamber. The main fuel injection valve 79 injects liquid fuel into the main combustion chamber to cause combustion of the liquid fuel. The gas injector 98 allows the air taken into the main combustion chamber to be mixed with gas fuel. Further, the engine device 21 is configured to allow a gas fuel pipe 41 and the liquid fuel pipes 42 to be separated to and disposed at both sides of the row of the head covers 40, which are arranged in one row. The gas fuel pipe 41 supplies gas fuel to each of the gas injectors 98. One of the liquid fuel pipes 42 supplies liquid fuel to each of the main fuel injection valves 79. Further, the engine device 21 is configured to allow the intake manifold 67, which supplies air to be taken into each of the main combustion chambers to a corresponding one of the intake valves 80, to be disposed so as to extend in parallel to the row of the head covers 40 inside the cylinder block 25. Further, the engine device 21 is configured to allow the gas fuel pipe 41 and the intake manifold 67 to be disposed side-by-side at one side of the row of the head covers 40.

The engine device 21 is configured to allow the gas fuel pipe 41 and the liquid fuel pipes 42 to be separated to and disposed at both sides of the row of the head covers 40 so as to be laid in peripheral regions of the row of the cylinder heads 26 on a space-saving basis. Thus, this configuration realizes a compact pipe layout structure. Further, the gas fuel pipe 41 and the intake manifold 67 are disposed at one side of the row of the head covers 40. Thus, this configuration realizes shortening of the piping distance between the gas fuel pipe 41 and each of the gas injectors 98, and thus, reduces a pressure loss in gas fuel flowing in the gas fuel pipe 41.

The engine device 21 is configured to allow the exhaust manifold 44, which discharges exhaust gas from the main combustion chambers, to be disposed so as to extend in parallel to the row of the head covers 40, and respectively allow the exhaust manifold 44 and the exhaust manifold 67 to be separated to and disposed at a position above the gas fuel combustion pipe 41 and a position below the gas fuel combustion pipe 41 at one side of the row of the head covers 40. Thus, the engine device 21 allows the gas fuel combustion pipe 41 and the exhaust manifold 44 to be laid as one set at one side of the row of the cylinder heads 26, and thus, this configuration enables the fuel injection pumps 89, each being configured to supply highly pressed liquid fuel to a corresponding one of the main fuel injection valves 79, to be disposed as one set together with the liquid fuel pipes 42 at the other side of the row of the cylinder heads 26.

The engine device 21 is configured to allow each of the main combustion chambers to include a corresponding one of the pilot fuel injection valves 82, and allows the pilot fuel pipe 47, which supplies pilot fuel to each of the pilot fuel injection valves 82, to be disposed so as to extend in parallel to the row of the head covers 40. Further, the engine device 21 is configured to allow the cooling water pipe 46 to be disposed at a position between the row of the head covers 40 and the exhaust manifold 44 and above the cylinder block 25 so as to extend in parallel to the row of the head covers 40, and allow the pilot fuel pipe 47 to be supported above the cooling water pipe 46. This support of the pilot fuel pipe 47 on the cooling water pipe 46 reduces heating up of the pilot fuel pipe 47 due to high temperature of the exhaust gas. Accordingly, this configuration of disposing the pilot fuel pipe 47 at the exhaust manifold 44 side realizes a compact disposition of the individual pipes.

The engine device 21 is configured to allow the gas fuel pipe 41 to have the double-wall pipe structure constituted of the inner pipe, which supplies gas fuel toward each of the gas injectors 98, and the outer pipe, into which gas fuel is flown from each of the gas injectors 98. This employment of such a double-wall pipe structure as the structure of the gas fuel pipe 41 realizes returning of leaked gas fuel to the fuel source side including the gas valve unit 35 and any other component, and this configuration keeps the pressure of the gas fuel pipe 41 constant.

The engine device 21 is configured to allow the supercharger 44, which allows air to be compressed by the exhaust gas from the exhaust manifold 44, to be disposed above one end of the engine device 21 itself, and allow the intercooler 51, which cools compressed air resulting from the compression by the supercharger 49 and supplies resultant compressed air to the intake manifold 67, to be disposed below the supercharger 49. The supercharger 49 and the intercooler 51 are disposed so as to overlap with each other at the one side of the engine device 21, and thus, this configuration realizes a compact structure in the engine device 21. Further, the supercharger 49 and the intercooler 51 are disposed at an upper position and a lower position so as to allow their positions to correspond to the upper position of the exhaust manifold 44 and the lower position of the intake manifold 67, and thus, this configuration realizes the shortest piping length in relation to the exhaust manifold 44 and the intake manifold 67 without any obstacle.

The engine device 21 is configured to allow the lubricant oil cooler 58 and the lubricant oil filter 59 to be arranged in series on one side face of the cylinder block 25, that is, on a gas fuel pipe 44 side face of the cylinder block 25. Further, the engine device 21 allows a lubricant oil cooling use cooling water pipe (first cooling water pipe) 60 to be disposed at a position between the gas fuel pipe 41 and the lubricant oil cooler 58 so as to extend along the lubricant oil cooler 58 in a state of being distanced from the one side face of the cylinder block 25. The lubricant oil cooling use cooling water pipe (first cooling water pipe) 60 allows cooling water supplied to the lubricant oil cooler 58 to be flown through the lubricant oil cooling use cooling water pipe (first cooling water pipe) 60 itself. Moreover, the engine device 21 allows a cylinder head cooling use cooling water pipe (second cooling water pipe) 46 to be disposed at a position above the cylinder block 25 and between the head covers 40 so as to extend in parallel to the row of the head covers 40. The cylinder head cooling use cooling water pipe (second cooling water pipe) 46 is coupled to the cylinder head 26.

The engine device 21 is configured to allow the lubricant oil cooler 58 and the lubricant oil filter 59 to be disposed on one side face of the engine device 21, that is, on a gas fuel pipe 44 side face of the engine device 21, and further allow the lubricant oil cooling use cooling water pipe (first cooling water pipe) 60, which supplies cooling water to the lubricant oil cooler 58, to be disposed on the one side of the engine device 21. This configuration realizes a compact disposition of the lubricant oil circulation system of the engine device 21, and facilitates a maintenance work for the lubricant oil circulation system. Moreover, the cylinder head cooling use cooling water pipe (second cooling water pipe) 46 is also disposed on the same face side as that of the lubricant oil cooling use cooling water pipe (first cooling water pipe) 60 at the upper side of the engine device 21, and thus, this configuration realizes a compact layout of the cooling water pipes disposed on the outer side the engine device 21 and thus, realizes shortening of the lengths of the cooling water pipes.

The engine device 21 is configured to allow the lubricant oil pump 55 to be disposed at a position that is located on one end face constituting the cylinder block 25 and being vertical to the engine output shaft 24, and that is located at the outer circumference side of the engine output shaft 24 and is located at the side of one side face (right side face) which constitutes the cylinder block 25 and on which the lubricant cooler 58 is disposed, and to further allow the lubricant oil pump 55 to supply the lubricant oil cooler 58 with lubricant oil sucked by the lubricant oil pump 55 itself. This configuration, therefore, allows the lubricant oil pump 55 to be disposed adjacent to the lubricant oil cooler 58, and thus realizes shortening of the length of a pipe for coupling the lubricant oil pump 55 to the lubricant oil cooler 58.

Additionally, the configurations of the individual portions are not limited to those illustrated in the above embodiment, and may be subjected to various modifications within a scope not departing from the gist of the present invention. Further, the engine device according to the above embodiment is applicable to components other than the above-described propulsion and power-generation mechanism, that is, the engine device according to the above embodiment is able to constitute, for example, a power generation device for supplying electric power to an electric system inside a ship, or a driving source in a land-based power generation facility.

The embodiments of the present invention relate to a multi-fuel employment type engine device capable of dealing with both of gas fuel, such as natural gas, and liquid fuel, such as heavy oil.

What is claimed is:

1. An engine device comprising:
   at least one cylinder;
   an intake manifold configured to supply air into the at least one cylinder;
   an exhaust manifold configured to discharge exhaust gas from the at least one cylinder;
   at least one main fuel injection valve configured to inject liquid fuel into the at least one cylinder;
   at least one gas injector configured to mix gas fuel with the air supplied by the intake manifold;
   a supercharger comprising a compressor and configured to compress air through a use of the exhaust gas from the exhaust manifold;
   an intercooler configured to cool compressed air resulting from the compression by the supercharger and supply resultant cooled air to the intake manifold;
   a main throttle valve disposed at a portion where an outlet of the compressor of the supercharger and an inlet of the intercooler are coupled to each other;
   an exhaust bypass flow path configured to couple an outlet of the exhaust manifold to an exhaust outlet of the supercharger;
   an exhaust bypass valve disposed in the exhaust bypass flow path;
   an air supply recirculation flow path configured to couple the outlet of the compressor of the supercharger to an inlet of the compressor of the supercharger, the air supply recirculation flow path including an inlet coupled to the outlet of the compressor of the supercharger and including an outlet coupled to the outlet of the compressor of the supercharger;
   an air supply recirculation valve disposed in the air supply recirculation flow path; and
   an engine control unit coupled to the main throttle valve; and
   wherein, within a low load range of a load on the engine device, the engine control unit is configured to:
      based on the load being lower than a predetermined load, perform a feedback control on the main throttle valve, and
      based on the load being higher than the predetermined load, perform a map control based on a data table on the main throttle valve.

2. The engine device according to claim 1, wherein within the low load range, when the load is higher than the predetermined load, the engine control unit is configured to perform the feedback control on the exhaust bypass valve and perform the map control on the air supply recirculation valve.

3. The engine device according to claim 1, wherein within the low load range, when the load is lower than the predetermined load, the engine control unit is configured to adjust the exhaust bypass valve to fully open and adjust the air supply recirculation valve to be fully closed.

4. The engine device according to claim 1, wherein within a medium and high load range of the load, the engine control unit is configured to adjust an opening degree of the main throttle valve to fully-open, and control each of the exhaust bypass valve and the air supply recirculation valve to allow pressure inside the intake manifold to be adjusted to a target value based on the load.

5. The engine device according to claim 4, wherein within the medium and high load range, the engine control unit is configured to perform the feedback control on the exhaust bypass valve, and perform the map control on the air supply recirculation valve.

6. The engine device according to claim 1, further comprising an intake relay pipe having a first end coupled to the outlet of the supercharger and a second end coupled to the inlet of the intercooler, wherein the intake relay pipe includes the main throttle valve.

7. The engine device according to claim 1, wherein the engine control unit is configured to provide one or more control signals to the main throttle valve.

8. The engine device according to claim 7, wherein the one or more control signals are associated with adjustment of an opening degree of the main throttle valve.

9. An engine system comprising:
an intake manifold configured to supply air into at least one cylinder;
an exhaust manifold configured to discharge exhaust gas from the at least one cylinder;
a supercharger comprising a compressor and configured to compress air through a use of the exhaust gas from the exhaust manifold;
an intercooler configured to cool compressed air resulting from the compression by the supercharger and supply resultant cooled air to the intake manifold;
a main throttle valve disposed at a portion where an outlet of the compressor of the supercharger and an inlet of the intercooler are coupled to each other;
an air supply recirculation flow path including:
an inlet coupled to an outlet side of the compressor of the supercharger; and
an outlet coupled to an inlet side of the compressor of the supercharger;
an engine control unit coupled to the main throttle valve;
wherein, within a low load range of a load on the engine system, the engine control unit is configured to adjust an opening degree of the main throttle valve:
responsive to a feedback control when the load is less than a predetermined load; and
responsive to a map control based on a data table when the load is greater than the predetermined load.

10. The engine system of claim 9, further comprising:
the at least one cylinder;
at least one main fuel injection valve configured to inject liquid fuel into the at least one cylinder; and
at least one gas injector configured to mix gas fuel with the air supplied by the intake manifold.

11. The engine system of claim 9, further comprising:
an exhaust bypass valve disposed in an exhaust bypass flow path configured to couple an outlet of the exhaust manifold to an exhaust outlet of the supercharger; and
an air supply recirculation valve disposed in the air supply recirculation flow path,
wherein:
the inlet of the air supply recirculation flow path is coupled between the intercooler and the main throttle valve, and
the engine control unit is configured to recirculate a portion of the compressed air discharged from the outlet of the compressor to the inlet of the compressor via the air supply recirculation flow path, the main throttle valve and the air supply recirculation valve.

12. The engine system of claim 9, wherein the engine control unit is configured to operate the engine system in a diesel mode or a gas mode.

13. An apparatus comprising:
an engine comprising:
an intake manifold configured to supply air into at least one cylinder;
an exhaust manifold configured to discharge exhaust gas from the at least one cylinder;
a supercharger comprising a compressor and configured to compress air through a use of the exhaust gas from the exhaust manifold;
an intercooler configured to cool compressed air resulting from the compression by the supercharger and supply resultant cooled air to the intake manifold;
a main throttle valve disposed at a portion where an outlet of the supercharger and an inlet of the intercooler are coupled to each other; and
an engine control unit coupled to the engine, the engine control unit configured to, within a low load range of a load on the engine:
perform a feedback control on the main throttle valve when a load on the engine is less than a predetermined load; and
perform a map control on the main throttle valve when the load is greater than the predetermined load, the map control based on a data table.

14. The apparatus of claim 13, further comprising:
an exhaust bypass valve disposed in an exhaust bypass flow path configured to couple an outlet of the exhaust manifold to an exhaust outlet of the supercharger; and
an air supply recirculation valve disposed in an air supply recirculation flow path configured to couple the outlet of the compressor of the supercharger to an inlet of the compressor of the supercharger,
wherein the engine control unit is further configured to, within the low load range, when the load is higher than the predetermined load, perform a feedback control on the exhaust bypass valve and perform a map control on the air supply recirculation valve.

15. The apparatus of claim 13, wherein the engine control unit is further configured to, within the low load range, when the load is lower than the predetermined load, initiate adjustment of an exhaust bypass valve to a fully open position and initiate adjustment of an air supply recirculation valve to a fully closed position.

16. The apparatus of claim 13, wherein the engine control unit is further configured to, wherein within a medium and high load range of the load, initiate adjustment of an opening degree of the main throttle valve to a fully-open opening degree, and control each of an exhaust bypass valve and an air supply recirculation valve to allow pressure inside the intake manifold to be adjusted to a target value based on the load.

17. The apparatus of claim 16, wherein the engine control unit is further configured to, within the medium and high load range, perform a feedback control on the exhaust bypass valve, and perform a map control on the air supply recirculation valve.

\* \* \* \* \*